United States Patent

Buonsante et al.

[15] 3,697,702

[45] Oct. 10, 1972

[54] SELECTABLY CONTROLLABLE ANNOUNCEMENT SYSTEM

[72] Inventors: John J. Buonsante, Harrison, N.Y.; Lambert Freericks, Hasbrouck Heights, N.J.; Howard J. Haarmann, Floral Park, N.Y.; John C. Sieglinger, Short Hills, N.J.

[73] Assignee: American Telephone and Telegraph Company, New York, N.Y.

[22] Filed: July 16, 1970

[21] Appl. No.: 55,500

[52] U.S. Cl. .............................179/18 B, 179/18 AH

[51] Int. Cl. ..............................................H04m 3/42

[58] Field of Search................179/18 G, 18 B, 18 BE

[56] References Cited

UNITED STATES PATENTS 2,535,661 12/1950 Adams et al. ............179/18 C

*Primary Examiner*—William C. Cooper

*Attorney*—James Warren Falk and Paul M. Enlow

[57] ABSTRACT

A central office switching center which is accessible by interoffice trunks from any of a number of other central office switching centers is arranged to return selected announcements to calling subscribers. An incoming register at the announcement central office is connected to an activated interoffice trunk and is arranged to receive the directory number uniquely associated with a called announcement. The incoming register is further arranged to establish an exclusive connection between the activated trunk and the called announcement circuit and to thereupon become disassociated from the connection.

26 Claims, 19 Drawing Figures

INVENTORS J.J. BUONSANTE
L. FREERICKS
H.J. HAARMANN
J.C. SIEGLINGER

BY David Mannenbaum
ATTORNEY

SELECTABLY CONTROLLABLE ANNOUNCEMENT SYSTEM

FIELD OF THE INVENTION

This invention relates to announcement systems in general and in particular to a central office switching center arranged to return selected announcements to calling subscribers under exclusive control of an incoming register at the announcement office.

BACKGROUND OF THE INVENTION

Numerous systems have been devised in the past for returning information such as announcements to calling subscribers. For example, it is well known that upon dialing a specific directory number a subscriber will receive an announcement giving the correct time; and that by dialing another number the subscriber may obtain the latest weather forecast. Sports information, traffic conditions, prayers and emergency information are but a few of the announcements currently available.

In typical installations, such announcements are provided by a central data source or by a group of announcement circuits which are associated with an actual central office switching center. In these systems, connections through the switching network are established to the data source or to a called announcement circuit in the same manner as are calls to any other subscriber served by the same system. Thus, in a common control switching system a marker is utilized to complete each announcement call to the proper destination.

Problems arise, however, when it is desired to provide subscribers with a large number of announcements, each accessible by a different dialed directory number. An example of such a situation is where a business advertiser informs the public via the mass media that more information concerning a specific product may be obtained by any individual by dialing a specific directory number. This concept can be expanded to include a list of special directory numbers each corresponding to a different product or service. In addition, many businesses may desire to use such an announcement service concurrently.

A switching system in order to provide this type of announcement service must be capable of handling large numbers of call completions from calling subscribers to individually addressed announcement circuits. Under such a unidirectional arrangement, connections are always terminated at the announcement circuits and never initiated therefrom. Accordingly the marker, which must have capacity to complete large numbers of calls to any of a number of announcement or termination circuits, is not balanced with an equal number of originating calls from those announcement circuits.

In customary system operation, marker usage tends to even out since the marker is called upon to perform a wide variety of functions. However, when the marker is only utilized to perform call completion routines, its operation becomes sporadic and extremely uneconomical.

Attempts to solve this marker loading problem and thereby to utilize the marker equipment efficiently have resulted in the distribution of announcement circuits over large numbers of central offices so that no one office becomes burdened inordinately. Such distribution techniques are practical only when the announcement is such that it is automatically changeable, such as weather or time. In situations where coordination between many announcements is necessary and where the announcements must be constantly changed, as in the example discussed above, the distribution of announcement circuits over many offices results in extremely costly operations. Thus, in the past only a few announcements, primarily of the repetitive or of the automatically changeable types, have been provided for use by the general public.

Accordingly, a need exists in the art for an economical central announcement switching center arranged to provide a large number of separately addressable announcements wherein each announcement is returned to a calling subscriber in response to the dialing by that subscriber of a specific directory number associated with the desired announcement.

A further need exists for a central office announcement center capable of operating with any existing central office switching center and wherein announcements are returned over an established trunk path between the announcement switching center and a calling switching center in response to a telephone directory number dialed by a calling subscriber.

SUMMARY OF THE INVENTION

These and other objects are achieved in accordance with the present invention wherein a central office switching center is arranged with announcement circuits, each having a unique directory number. The directory number of a called announcement circuit is received over an incoming trunk by an idle incoming register. The incoming register translates the received directory number into a code representative of the desired announcement and a terminating connection is completed, under exclusive control of the incoming register, from the incoming trunk to the announcement circuit corresponding to the received directory number. When the terminating connection is established, the register transfers control of the connection to the incoming trunk and thereupon becomes free to control other incoming calls.

Accordingly, it is a feature of the present invention to provide a central office data retrieval center arranged to connect, under exclusive control of a register, any one of a number of trunks to any one of a number of data terminations in response to the directory number of the data termination transmitted over the trunk to the controlling register.

It is another feature of the present invention to provide an announcement telephone switching center fully compatible with any other telephone switching center wherein incoming trunks are divided into trunk groups, data transmission circuits such as announcement circuits are divided into announcement groups, registers are divided into register groups, and wherein connections are established between any calling trunk in any trunk group and any announcement circuit in any announcement group exclusively under control of a selected register in any register group, which register transfers control of the established connection to the calling trunk and becomes disassociated therefrom.

DESCRIPTION OF THE DRAWING

The foregoing objects, features and advantages, as well as others of the invention, will be more apparent from the following description of the drawing, in which.

It will be noted that FIGS. 2 through 17 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505–513.

Figure 2:
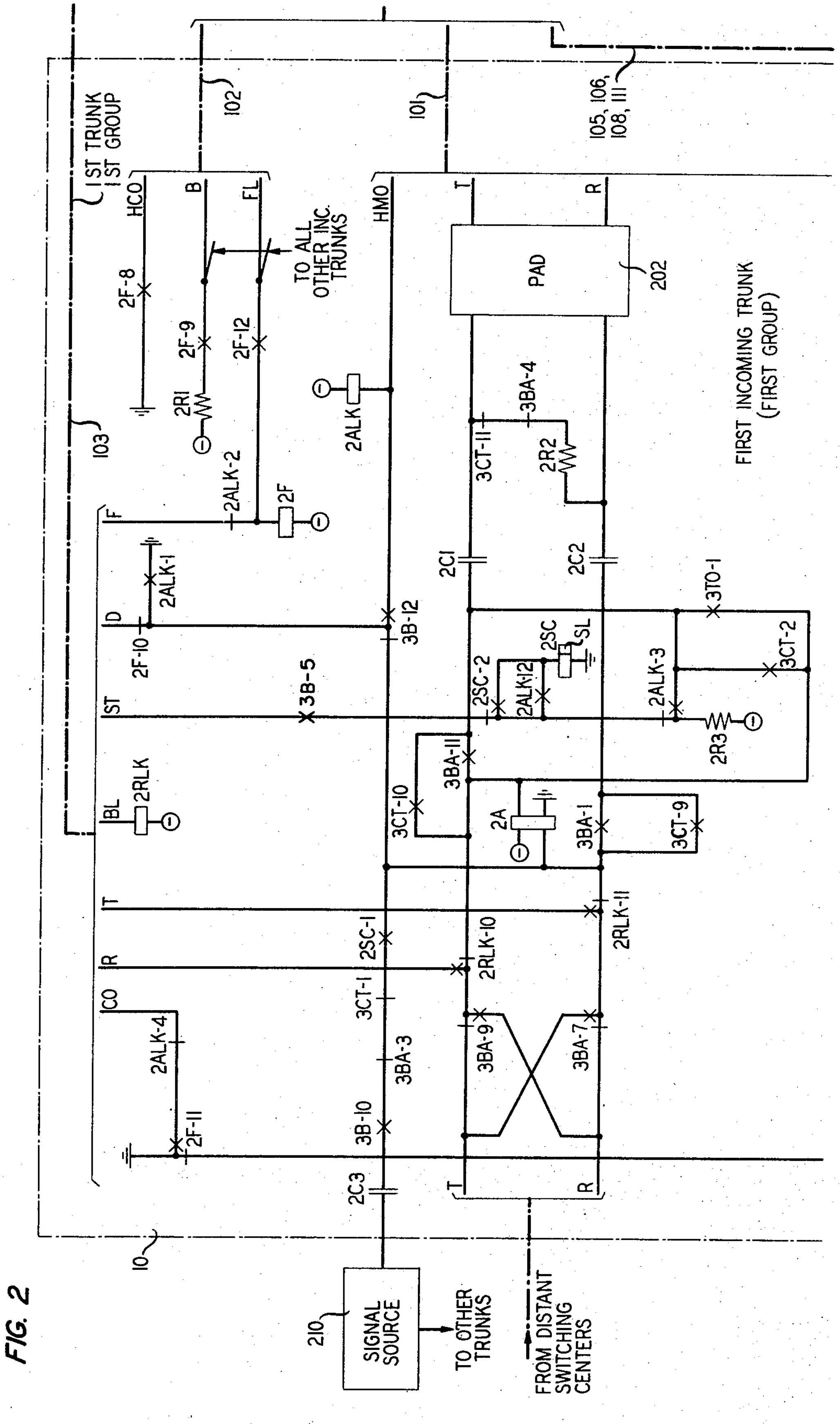
FIGS 2 through 17 are schematic drawings showing in greater detail the interrelation of the components of the exemplary embodiment.

It will be noted also that in order to simplify the disclosure and thus facilitate a more complete understanding of the embodiment, the relays, relay contacts and other electromechanical devices shown in FIGS. 2 through 17 have been given systematic designations. Thus, the number preceding the letters of each device correspond to the figure in which the control circuit of the device is shown. Thus, the coil of relay 2A is shown in FIG. 2. Each relay contact, either make, break or transfer, is shown with its specific contact number preceded by the designation of the relay to which it belongs. For example, the notation 2A–8 indicates contact number 8 of relay 2A, the coil of which is shown in FIG. 2.

INTRODUCTION

The unidirectional announcement switching center of the present invention is illustrated as working in conjunction with a plurality of other central office switching centers which are connected to the announcement center via interoffice trunk circuits. When such a trunk circuit is viewed from a call terminating switching center, such as from the announcement switching center, of the instant embodiment, it is usually referred to as an incoming trunk since connection information as dialed by a subscriber at the distant switching center is incoming to the terminating center over the trunk circuit.

In the embodiment, this connection information is passed from the distant switching center to the announcement switching center in the form of multifrequency signals in the manner well known in the art. However, it is understood that the announcement switching center is not limited to operating with such signals but in fact may be arranged to function with any type of signal from any type of distant switching center.

For purposes of illustration, it is intended that the apparatus of the incoming trunk circuits 10, 11, 12, and 13 and of the incoming register circuits 16 and 17 be similar to corresponding apparatus disclosed in the A. J. Busch U.S. Pat. No. 2,585,904, issued Feb. 19, 1952.

In order to further facilitate an understanding of the invention, the description of the operation of an exemplary embodiment has been subdivided into a general description portion designated 1.00, and a detailed description portion designated 2.00. Section 1.00 describes the invention in general terms with respect to FIGS. 1 and 18. Section 2.00 and its subsections describe the invention in detail with respect to FIGS. 2 through 17.

1.00 GENERAL DESCRIPTION

Figure 1:
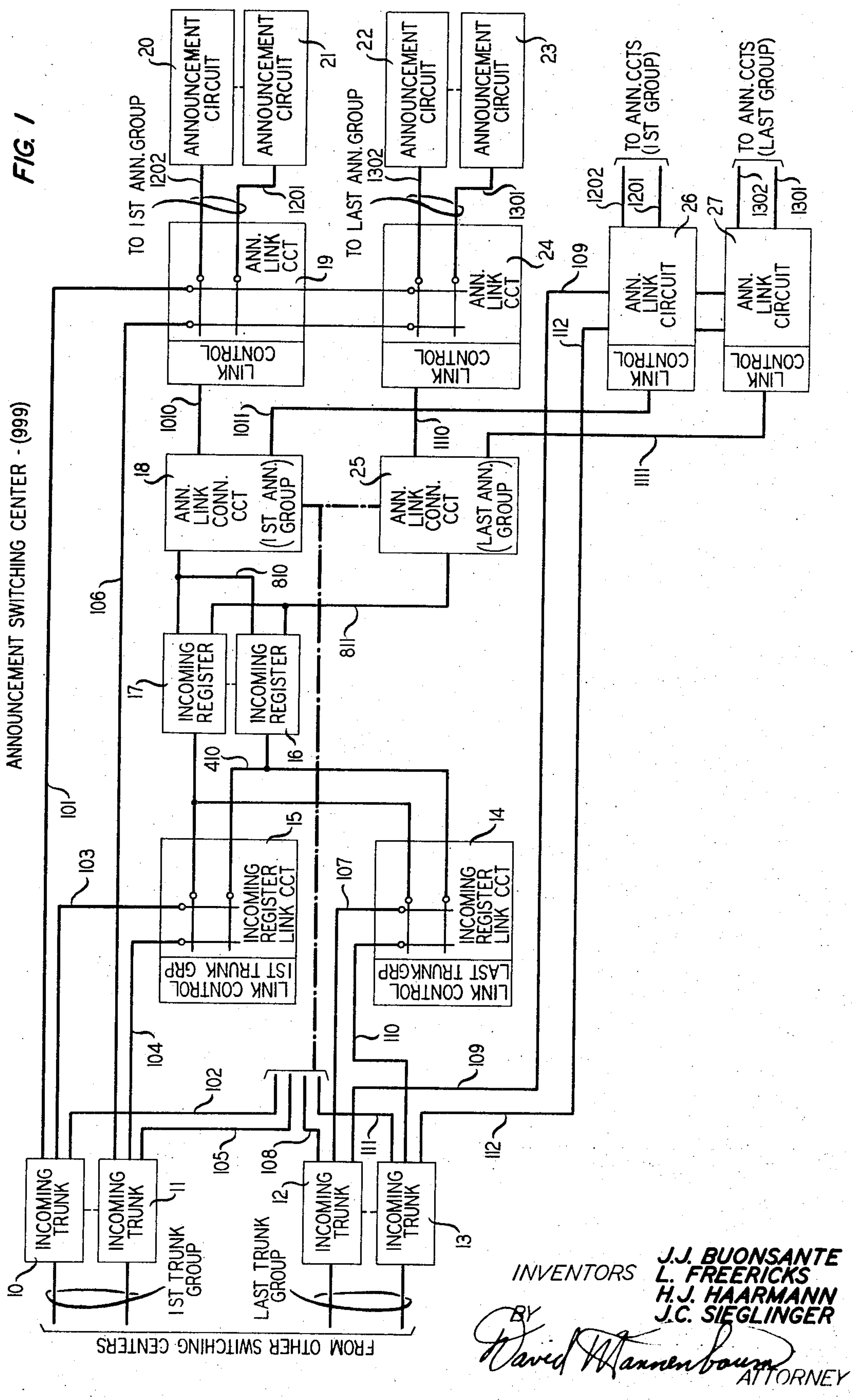
FIG. 1 is a block diagram showing the interrelation of the exemplary embodiment of the invention.

Turning now to FIG. 1, when a subscriber served by a distant central office switching center, not shown, goes off-hook and dials or otherwise transmits the directory number (994+four digits) assigned to a particular announcement circuit or other terminating circuit device, such as announcement circuit 20 in announcement switching center 999, the distant office stores the dialed directory number in the well-known manner. Upon completion of the dialing interval, the calling office utilizes the first three digits, 999, of the dialed number to determine the called switching center. The calling office thereupon seizes an idle interoffice trunk circuit, such as trunk circuit 10 to the switching center 999.

The activation of incoming trunk 10 at the announcement switching center 999 causes an incoming register link circuit serving the trunk group associated with incoming trunk 10, such as incoming register link circuit 15, to bid for an idle incoming register, such as incoming register 16. Circuitry in the incoming register link circuit, after determining the busy-idle status of all the incoming registers, checks the priority of the idle incoming registers and proceeds to establish a crossbar link connection between the activated incoming trunk circuit and the highest priority idle incoming register. During this stage of the connection process, the call is under control of the incoming register link circuit associated with the trunk group of the activated trunk.

Continuing in FIG. 1, once the selected incoming register is attached to the activated incoming trunk through the crossbar matrix of the incoming register link circuit, the control circuitry of the link is free to serve other incoming connections and the crosspoint connection is maintained under exclusive control of the connected incoming register.

At this point, the incoming register 16 signals back in the well-known manner over the incoming trunk circuit 10 to the calling switching center that the announcement switching center 999 is ready to receive the last four digits of the dialed directory number. It should be noted at this point that only the first two digits of the dialed directory number are needed to fully describe the called station since the announcement switching center of the embodiment is arranged to handle only 100 separate announcements. However, in order to avoid the premature release of the calling switching center, the incoming register accepts all four transmitted digits, but only the first two digits are translated by the incoming register into a code exclusively associated with the called announcement circuit. In the event that it is desired to increase the announcement capacity of the announcement switching center to 1,000 or to 10,000 announcements, it would be a straightforward matter to translate the other transmitted digits by expanding the translation and final switching networks accordingly.

When the translation function has been completed, the controlling incoming register circuit 16 selects an announcement link connector circuit associated with the called announcement circuit, such as announcement link connector circuit 18. The incoming register thereupon provides information to the selected announcement link connector circuit concerning the trunk group assigned to the incoming trunk. Accordingly, under control of the incoming register 16, a connection is prepared through the crossbar switching network of the announcement link circuit, such as announcement link circuit 19, associated with the called announcement circuit 20 and with the trunk group associated with incoming trunk 10.

It should be noted that the final calling connection through the selected announcement link circuit 19 is a direct connection from the incoming trunk 10 to announcement circuit 20, and is entirely separate from the previously established connection from the incoming trunk 10 to the incoming register 16. The final connection is controlled by a signal which is communicated to the announcement link circuit 19 over a path which extends from the announcement link circuit 19, back through the controlling incoming register 16 and over the previously established linkage path to the incoming trunk 10 and from the incoming trunk 10 directly to the announcement link circuit 19 so as to enable a linkage path through the announcement link circuit 19 from the selected announcement circuit 20 to the calling incoming trunk 10. Once this second or calling connection is established, the controlling incoming register 16 transfers control of the connection to the calling incoming trunk 10 and thereupon becomes free to handle other terminating connections.

When the calling connection is established, the incoming trunk is arranged to return a signal over the calling incoming trunk back to the calling switching center as an indication that the calling subscriber can be charged, or a message unit added, for the call. At this point the announcement message associated with the called directory number is returned from announcement circuit 20 and via the final calling connection and over the interoffice trunk to the calling subscriber. In the embodiment, this message is returned in an audible format in the well-known manner, and provision is included to ensure that at least one, but not more than two, full announcements are returned to the subscriber.

In the event the incoming connection had been directed to a nonassigned or nonworking announcement code, the controlling incoming register 16 would have, in the manner to be more fully detailed hereinafter, established a calling connection to a special announcement circuit arranged to return a standard message indicating that the dialed directory number is not a working announcement. In this situation, although an announcement is returned to the calling subscriber, a charge signal is not transmitted to the calling switching center so that the calling subscriber is not charged for the call.

2.00 DETAILED DESCRIPTION

The following text will describe the embodiment of the invention in detail with reference to FIGS. 2 through 17. We shall assume that a subscriber at a station associated with a distant central office (not shown) desires to listen to the announcement message associated with the directory number, 999–0123. Further, let us assume that the announcement circuit which is arranged to provide the desired message is announcement circuit 20.

As well known in the art and as detailed in the before-mentioned Busch patent, the calling subscriber at the distant office (not shown) goes off-hook and dials or pulses the directory number 999–0123. The first three numbers, 999, are used by the calling office to determine the switching center, which in this instance is the announcement switching center 999, to which the call is directed. Once this determination is made, the calling switching center in a manner well known in the art selects an idle interoffice trunk to the called switching center and causes a low resistance path to be placed across the tip and ring (T and R) leads of the selected trunk as an enabling signal to the called office. It should be noted that insofar as the calling office is concerned, the call to the announcement office is handled exactly as a call to any other central office and thus no modifications are required at any distant switching center in order to provide announcement service to subscribers connected thereto.

2.1 Establishment of a Linkage From an Activated Trunk to an Idle Register

Turning now to FIG. 2, battery is extended through a first winding of relay 2A in the incoming trunk portion of the activated interoffice trunk 10 and through released break contacts 2RLK–10 and 3BA–9 and over the T lead of the interoffice trunk to the distant calling office. This battery is returned via the now low resistance path at the calling office and over the R lead of the interoffice trunk 10 and through released break contacts 3BA–7 and 2RLK–11 to ground through a second winding of relay 2A. Relay 2A operates at this point and enables the operation of relay 3B, FIG. 3, via enabled make contact 2A–9.

Figure 4:
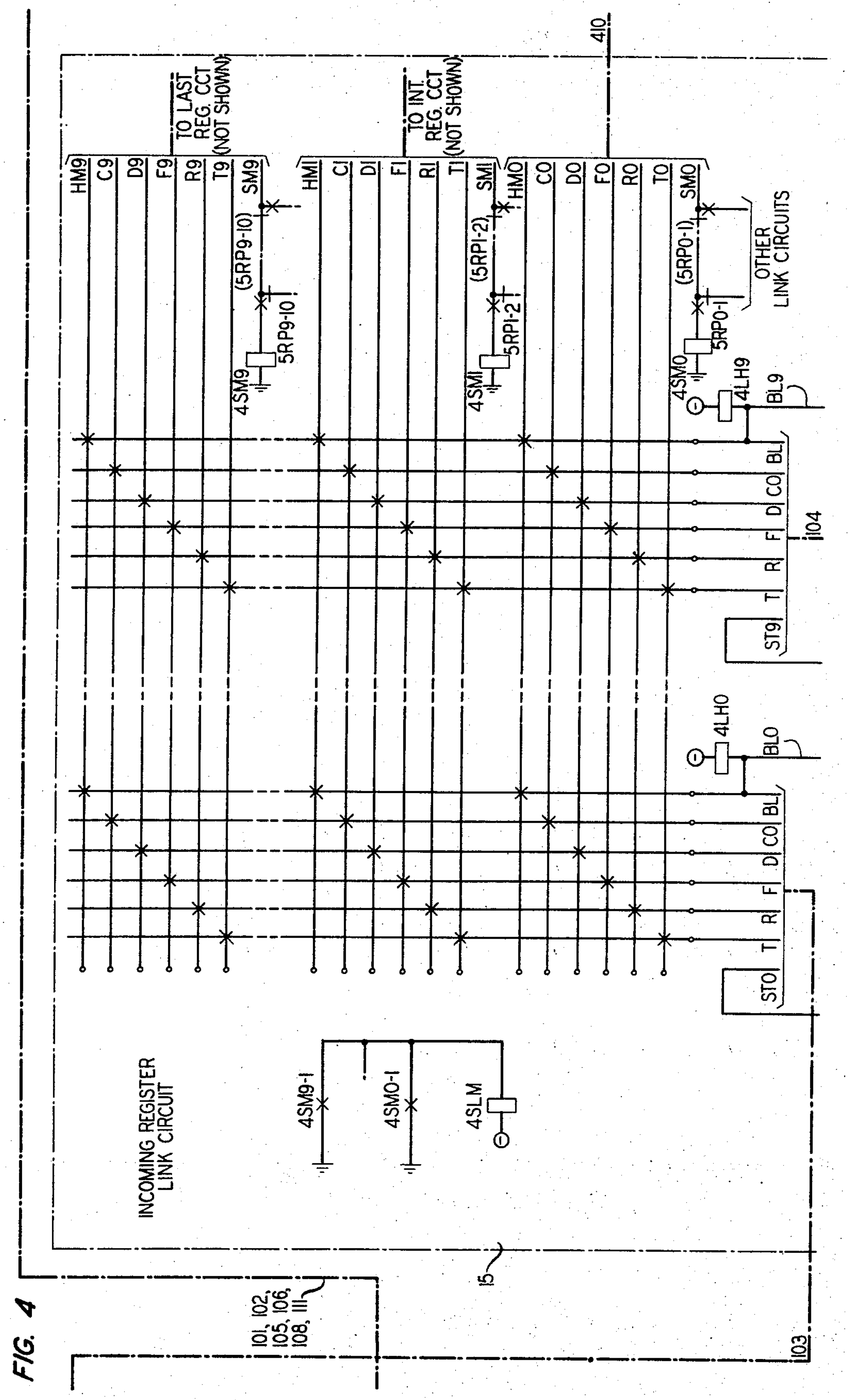
Figure 5:
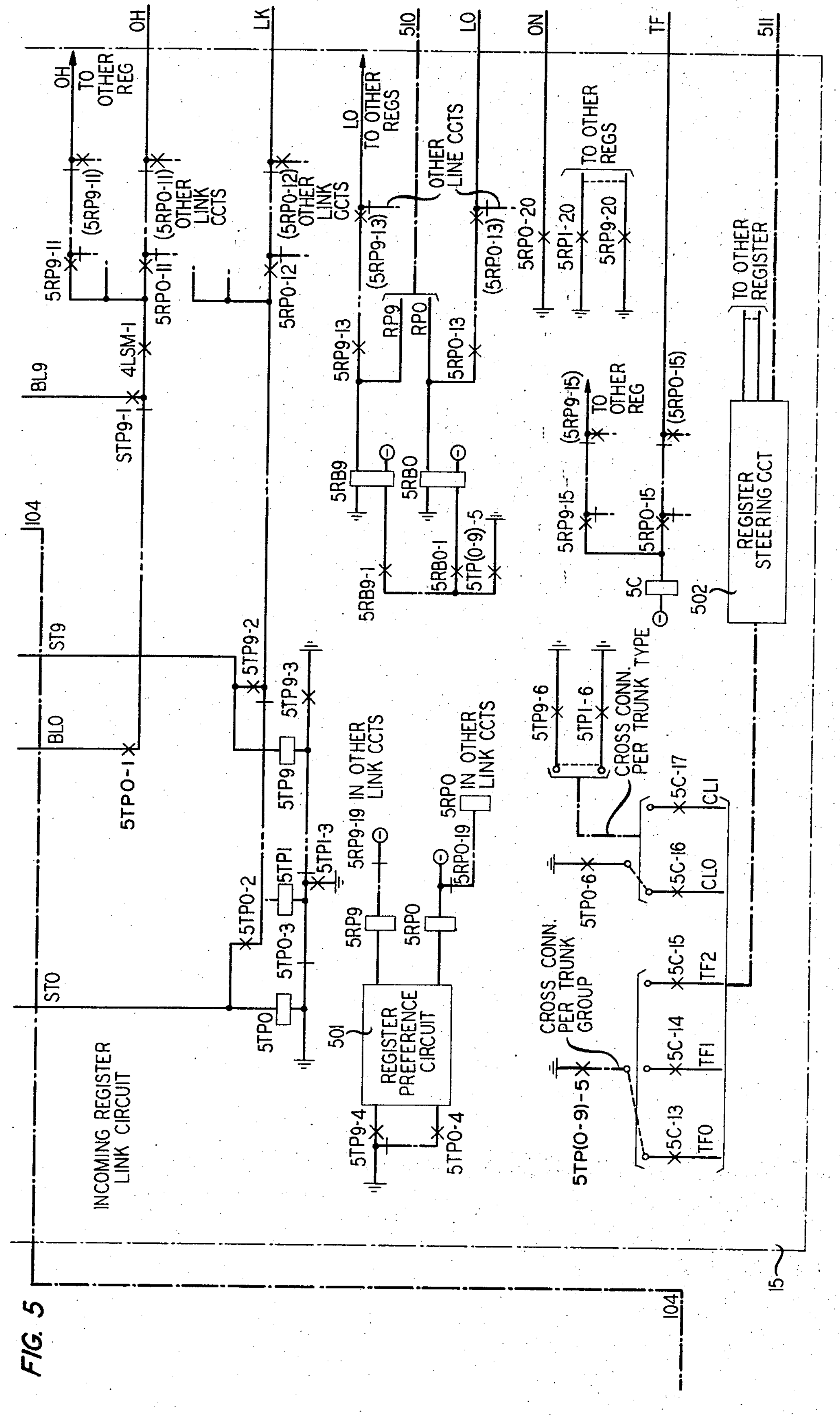

The enabling of relay 3B causes a resistance battery, via resistor 2R3, FIG. 2, to be extended through released break contacts 2ALK–3 and 2SC–2 and enabled make contact 3B–5 over lead ST and cable 103 to incoming register link circuit 15, FIG. 4, and over lead STO to FIG. 5 and through the winding of trunk preference relay 5TPO to ground. Relay 5TPO thereupon operates and removes ground via enabled break contact 5TPO–3 from all higher numbered 5TP– relays.

Figure 17:
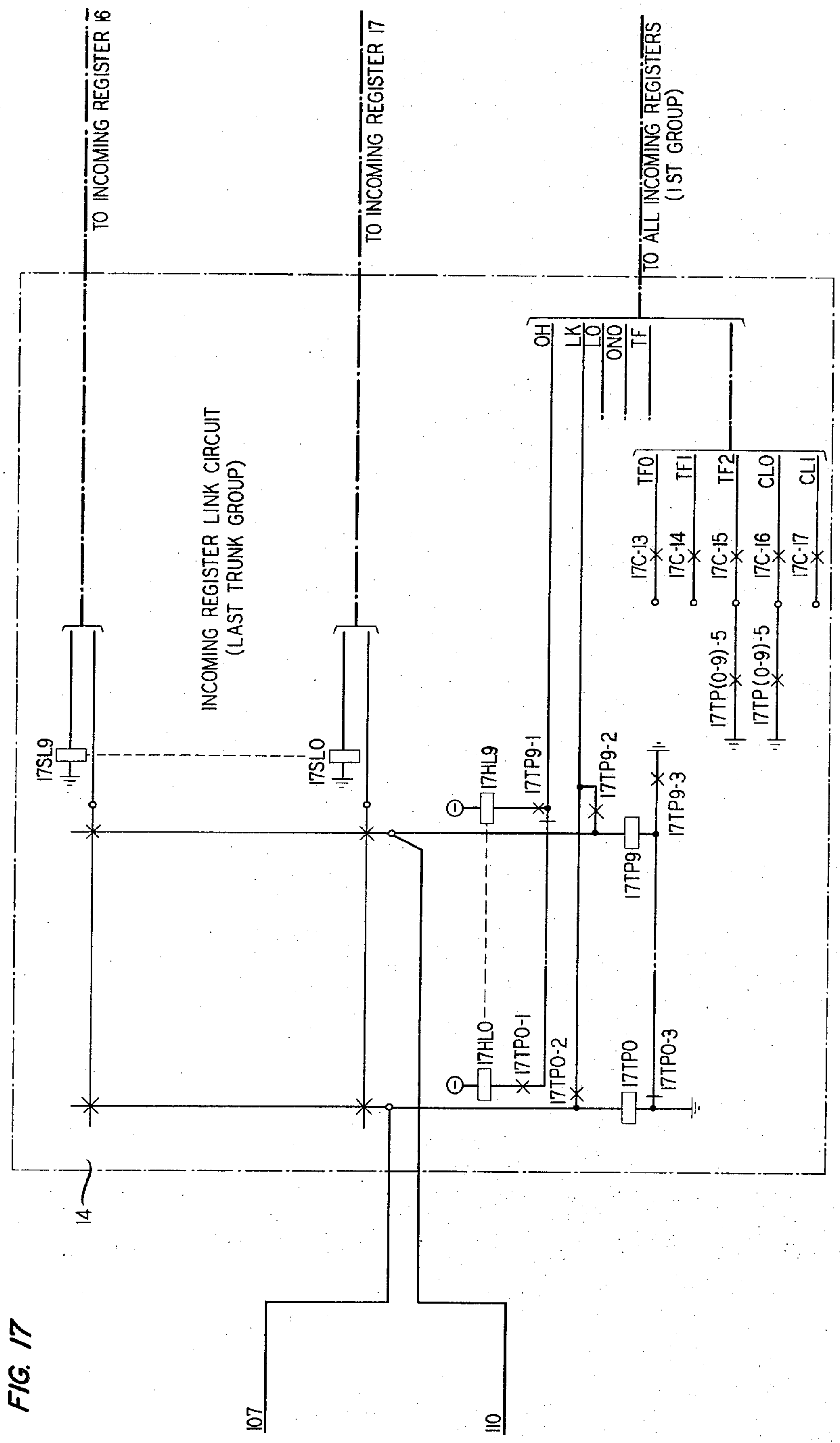

Incoming register link circuit 15 is arranged with a control circuit, FIG. 5, and with a link network, FIG. 4, to connect any trunk in a first group of trunks to any register served by the incoming register link circuit 15. In similar manner, incoming register link circuit 14, FIG. 17, is arranged to connect any trunk in a last group of trunks to any register served thereby. Trunks in intermediate trunk groups (not shown) are served by intermediate register link circuits (not shown) in the same manner as are trunks in the first and last trunk groups.

Continuing now in FIG. 5, since all of the trunk preference 5TP– relays in a trunk group are in a preference chain, only one trunk connection can proceed at a time. The operation of any intermediate 5TP– (not shown) in a trunk group opens ground from the windings of all the higher numbered 5TP– relays as illustrated by enabled break contact 5TPO–3. Lower numbered 5TP– relays may operate but can do no work at this point since all of the work leads, such as leads OH and LK, are in a chain running in the opposite direction from higher to lower and the chain is therefore open at the higher numbered relays. If during the time one calling trunk is being served other 5TP– relays should operate, the corresponding trunks will be served in order starting from the highest number, as controlled by the work lead chains. Trunks which are not able to operate their respective 5TP– relays must wait until the last operated 5TP– relay is released before being served.

As shown in FIG. 5, ground through trunk preference chain 5TP9–4 and the enabled make contact 5TPO–4 enabled the register preference circuit 501, which circuit is arranged in any one of the well-known circuit configurations operable to determine which ones of the associated registers are idle and to determine which one of the idle registers is at this point the most preferred register. Accordingly, ground through register preference circuit 501 causes relay 5RPO to operate to battery.

It should be noted at this point that the chain of preference relays 5RP– would be different in each of the trunk groups, the object being to distribute the traffic over the registers in such a way that there is a minimum of interference between trunk groups. This preference chain is arranged in a closed loop fashion and may be thought of as rings with the start leads entering the chain at different points in each trunk group. The purpose of closing the ring is to permit shifting the starting point if this becomes necessary because of wear on the preferred circuit. The number sequence of the registers is the same on each trunk group.

It will also be noted that the battery for operating the register preference 5RP– relays is taken through a chain of contacts on the 5RP– relays associated with that register in other trunk groups. Thus, if during a heavy load two different trunk groups should be directed toward the register preference relay for the same register and simultaneous bids should occur, only one 5RP– relay would operate. The battery chains through the 5RP– relays are so arranged that the initial preference of a register for a trunk group is the same as the initial preference of a trunk group for a register. For example, if the first trunk group has register 16 as first choice, then the register preference relay 5RPO associated with register 16 is nearest to battery. This results in distributing the register choice for trunk groups for the purpose of minimizing what is commonly called grooving under heavy load conditions. When all registers are busy and calls are waiting, the same trunk group will not usually be preferred as successive registers become free even though all waiting calls are directed to the same register. Since generally there are more registers than trunk groups, the 5RP– battery chains are necessarily in the same order in more than one register control.

Figure 7:
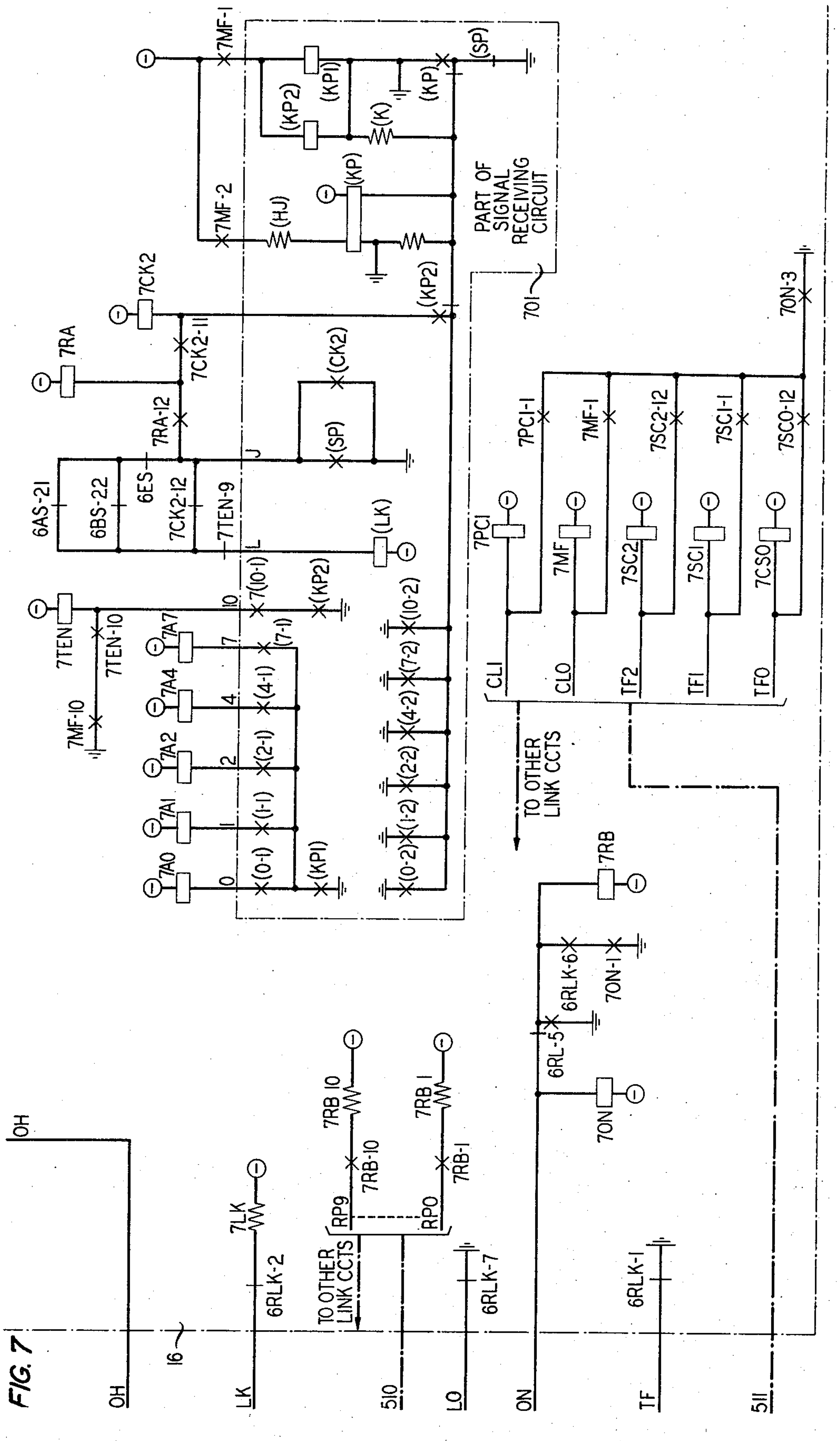

Returning again to FIG. 5, the operation of relay 5RPO extends ground via enabled make contact 5RPO–20 and lead ON to the selected available incoming register 16, FIG. 7, thereby enabling relays 7ON and 7RB in the selected register. Incoming register 16, thereupon returns resistance battery via resistor 7LK and released break contact 6RLK–2 over lead LK to FIG. 5 and through the 5RP– register preference chain and enabled make contact 5RPO–12 and through the 5TP– trunk preference chain and enabled make contact 5TPO–2 to the winding of the previously operated 5TPO relay.

Figure 6:
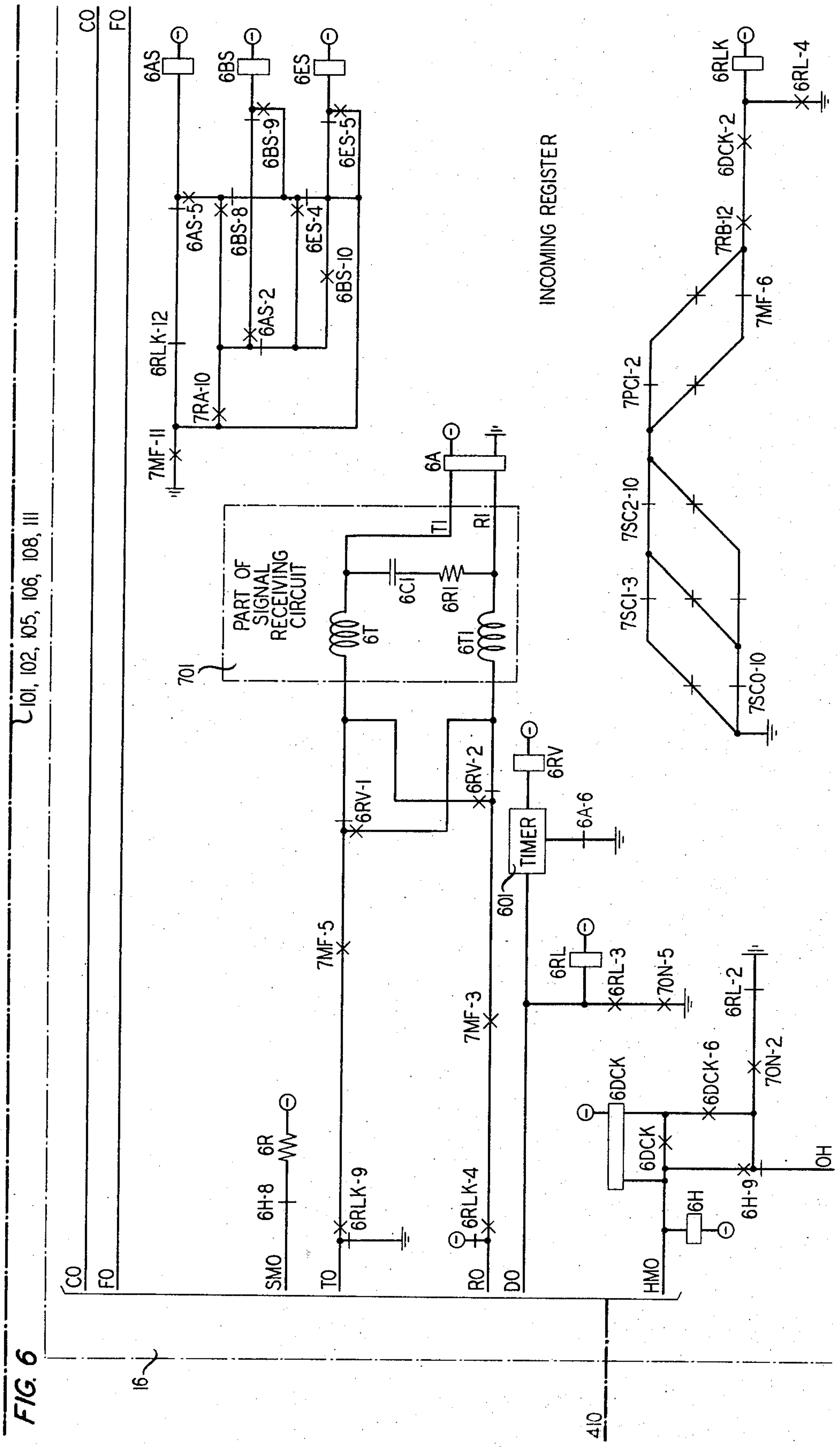

Turning now to FIG. 6, resistance battery via resistor 6R and released break contact 6H–8 is extended over lead SMO and cable 410 to FIG. 4 to the link network portion of the incoming register link circuit 15 and via the 5RP– register preference chain and enabled make contact 5RPO–1 associated with the trunk group of the calling trunk to enable the select magnet 4SMO associated with the horizontal multiple connected to the selected incoming register 16. The enabling of select magnet 4SMO prepares a horizontal multiple through the crossbar switching network in the well-known manner so that the leads associated with incoming register 16 can now be cut through to the corresponding vertical multiple leads of any trunk in the first trunk group upon the operation of one of the hold magnets of the link network.

Continuing now in FIG. 4, the enabling of select magnet 4SMO enables the operation of relay 4SLM from ground via enabled off-normal select magnet contact 4SMO–1. The enabling of relay 4SLM enables the operation of the hold magnet 4LHO associated with the activated incoming trunk 10 over a path which extends from ground, FIG. 6, via released break contact 6RL–2, enabled make contact 7ON–2, lead OH through FIG. 7 to FIG. 5 and through the 5RP– register preference chain associated with register 16 and enabled make contact 5RPO–11 associated with the trunk group of the calling trunk 10 through now enabled make contact 4SLM–1 and the 5TP– trunk preference chain and enabled make contact 5TPO–1 via lead BLO to FIG. 4 and through the 4LHO hold magnet coil to ground.

Figure 3:
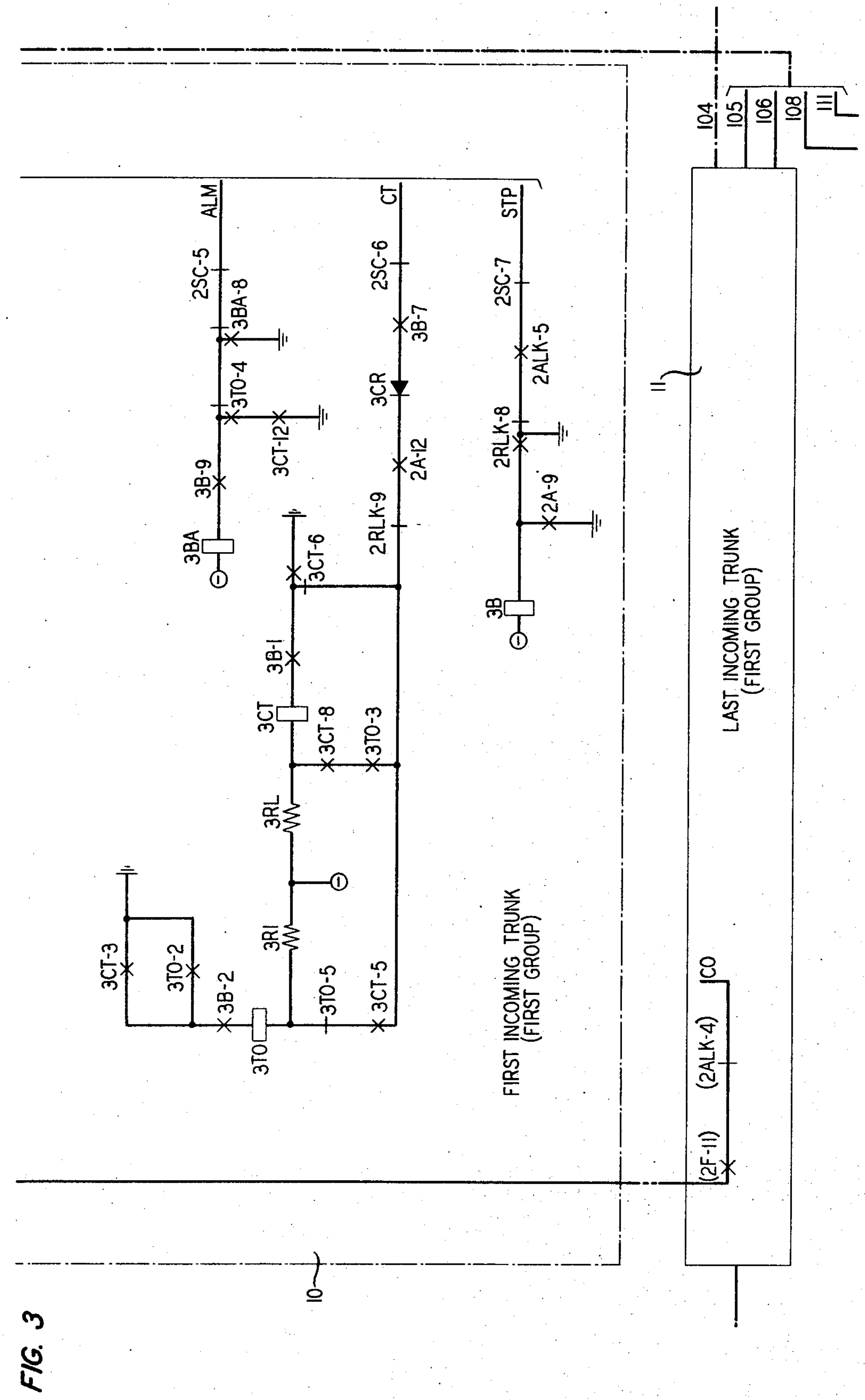

Upon closure of the crosspoint linkage, ground is extended via lead BL, FIG. 4, over cable 103 to the incoming trunk 10, FIG. 2, associated with the operated hold magnet 4LHO, thereby enabling relay 2RLK. Relay 2RLK operating, transfers control of the T and R leads of the trunk from the windings of relay 2A to incoming register 16 via enabled transfer contacts 2RLK–10 and 2RLK–11 and cable 103 and the linkage connection (multiples T and R) through the switching network, FIG. 4. Ground is maintained on the T lead via released break contact 6RLK–9, FIG. 6, and battery is maintained on the R lead via released break contact 6RLK–4. Relay 2A releases at this point, but relay 3B, FIG. 3, is maintained operated via enabled make contact 2RLK–8.

Ground is also returned through the enabled crosspoint from lead BL, FIG. 4, to lead HMO and cable 410 to the associated incoming register 16, FIG. 6. This ground causes the operation of relay 6H, thereby transferring the hold magnet operating ground, via now enabled transfer contact 6H–9, from the preference chain (lead OH) to direct control via the enabled crosspoint linkage and lead HMO. Relay 6DCK operates at this point unless there is a ground already on the crosspoint, such as would occur if two crosspoints were closed to the same register. If the 6DCK relay does not operate at this point, a link release alarm occurs and the register releases.

The enabling of relay 6H removes resistance battery from lead SMO, via enabled break contact 6H–8, thereby releasing the select magnet of the crossbar link, FIG. 4. However, as is well known in the art, a linkage connection is maintained at this point from the seized incoming register 16, through the link network to the activated interoffice incoming trunk 10, which linkage connection is now under exclusive control of the incoming register 16, via ground on lead HMO.

Turning again to FIG. 2, the operation of relay 2RLK enables the operation of relay 2SC from resistance battery through resistor 2R3, released break contact 2ALK–3, and enabled make contact 2ALK–12. Relay 2SC locks operated via enabled transfer contact 2SC–2, which contact also serves to remove battery from lead ST to the attached incoming register link circuit 15. Lead STO had been utilized to operate trunk preference relay 5TPO, FIG. 5, in the manner set forth above, which relay now holds operated via its own make contact 5TPO–2 to ground in the attached incoming register 16. The operation of relay 2SC controls the provision of ringing tone back to the calling station in the manner to be discussed in more detail hereinafter.

Summarizing briefly at this point, upon the activation of an incoming trunk the register link associated with the trunk group in which the calling trunk is located determined which ones of the incoming registers were idle and which one of the idle registers was the most preferred register for that link. A connection was then established between the activated incoming trunk through the link switching network to the selected incoming register. Control of the incoming register link was then transferred from the calling trunk to the selected register.

2.2 Transfer of Trunk Identification to the Seized Register

Turning again to FIG. 5, concurrent with the above-described crosspoint cut-through, relay 5C is operated through make contact 5RPO–15 of the 5RP– register preference chain and lead TF from FIG. 7 from ground through released break contact 6RLK–1 in the incoming register 16. The enabling of relay 5C– places ground on two of the five leads TFO, TF1, TF2, CLO and CL1. The precise two leads which are grounded at this time are determined by the trunk type (leads CLO and CL1) and the trunk group (leads TFO, TF1 and TF2) associated with the currently activated incoming trunk 10. Accordingly, assuming trunk 10 to be a multifrequency type trunk, ground via enabled make contacts 5TPO–6 and 5C–16 is placed on lead CLO (MF type trunk) and ground via enabled make contacts 5TPO–5 and 5C–13 is placed on lead TFO (first trunk group). These grounds are extended through register steering circuit 502, which circuit is arranged in the well-known manner to connect the cross-connection field to the proper incoming register, to incoming register 16, FIG. 7, via cable 511. Accordingly, relays 7MF and 7SCO operate in register 16 in a straightforward manner. These relays, once operated, lock operated through their respective make contacts to ground via enabled make contact 7ON–3. The purpose for enabling these two particular relays will become more apparent from that which is contained hereinafter.

2.3 Register Busy Control

Continuing in FIG. 7, resistance batteries via resistors 7RB1 through 7RB10 and enabled make contacts 7RB–1 through 7RB–10 are extended over leads RPO through RP9 and cable 510 to FIG. 5 and to all incoming register link circuits, including incoming register link circuit 15. Accordingly, resistance battery is extended over the corresponding RPO through RP9 leads to operate the corresponding 5RBO through 5RB9 relays in all links; except that the 5RB– relay associated with the currently activated incoming register 16 in the link associated with the calling trunk 10, which in this case is relay 5RBO, is maintained in a released condition via a shunt ground through the enabled make contact 5RPO–13 associated with link circuit 15 and lead LO from released break contact 6RLK–7, FIG. 7, in incoming register 16. The 5RB– relays serve as register busy relays so that the register preference circuit in all other trunk groups is advanced beyond the currently activated incoming register 16.

2.4 Release of Incoming Register Link Control Circuit

Turning now to FIG. 7, once the trunk identification information is transferred to the controlling incoming register 16 and two of the five relays 7PC1, 7MF, 7SC2, 7SC1, 7SCO, are operated, ground via enabled make contact 7SCO–10, FIG. 6, released break contacts 7SC1–3 and 7SC2–10, which contacts are arranged to ensure that only one relay out of the group of relays 7SCO, 7SC1 and 7SC2 is extended through released break contact 7PC1–2 and enabled make contact 7MF–6, which contacts are arranged to ensure that only one relay out of the group of relays 7PC1 and 7MF is operated and through enabled make contacts 7RB–12 and 6DCK–2 to operate relay 6RLK. The enabling of relay 6RLK provides an alternate holding path for relay 70N, FIG. 7, via ground through enabled make contacts 70N–1 and 6RLK–6 and released transfer contact 6RL–5. Relay 6RLK operating also removes ground from leads TF and LO, FIG. 7, via enabled break contacts 6RLK–1 and 6RLK–7, respectively, thereby releasing the connector relay 5C, and the 5RBO relay in register link circuit 15, FIG. 5. Battery is removed from lead LK, via enabled break contact 6RLK–2, FIG. 7, thereby releasing relay 5TPO in the register link circuit 15, FIG. 5.

Again summarizing briefly, after a connection between a calling trunk and an idle register had been established, trunk identification information was communicated to the register and checked for validity. Upon satisfaction of the validity check, the incoming register link circuit 15 was completely released from incoming register 16 and became available to serve any other incoming trunk associated with the first group of trunks.

2.5 Signaling From the Calling Switching Center to the Controlling Incoming Register 16

Turning again to FIG. 6, when the 6RLK relay operates at the completion of the trunk identification transfer interval, as discussed above, the TO and RO leads which had been extended from incoming trunk 10, leads T and R and cable 103, through the crosspoint matrix to incoming register 16, are extended to the windings of relay 6A via enabled transfer contacts 6RLK–9, and 6RLK–4, enabled make contacts 7MF–5, 7MF–3, released transfer contacts 6RV–1 and 6RV–2 and via signal receiving circuit 701. The connection of relay 6A to the TO and RO leads is in effect a reversal of the tip and ring conductors since ground which had been on lead TO via released break contact 6RLK–9 is replaced by battery from the winding of relay 6A and battery which had been on lead RO via released break contact 6RLK–4 is replaced by ground from the winding of relay 6A. This reversal is transmitted through the previously established linkage connection and back over the interoffice trunk to the calling office. Relay 6A operates at this time and enables timer 601 via enabled break contact 6A–6. Timer 601 is arranged in any one of the well-known circuit configurations operable after ground has been removed from a terminal for a certain specified interval to operate relay 6RV. Accordingly, after a delay period, relay 6RV operates and thereby causes another reversal via enabled transfer contacts 6RV–1 and 6RV–2 of the tip and ring polarity. This second reversal satisfies the sender trunk test at the distant office, in the manner well known in the art, thereby enabling the distant sender to commence pulsing.

Digressing momentarily, supervision is maintained in the register by the 6A relay. If the 6A relay releases for more than approximately 200 milliseconds (meaning the call is abandoned) timer 601 will function and operate relay 6RL, the operation of which will cause incoming register 16 to release.

Turning again to FIG. 7, the enabled 7MF relay prepares the register to receive multifrequency pulse signals by connecting battery to signal receiving circuit 701 via enabled make contacts 7MF–2 and 7MF–1. Signal receiving circuit 701 part of which is shown on FIG. 6 and part on FIG. 7, is arranged in the well-known circuit configuration operable to detect frequency tones on a pair of transmission leads (shown in FIG. 6) and to operate certain relays representative of those tones.

Turning now to FIG. 6, when relay 7MF operated, relay 6AS operated from ground through enabled make contact 7MF–11 and released break contacts 6RLK–12 and 6AS–5. Once operated, relay 6AS locks operated via ground through enabled make contact 7MF–11 and released break contacts 6ES–4, 6BS–8 and enabled transfer contact 6AS–5. At this point the controlling incoming register 16 is prepared to receive the first digit stored at the distant office.

As is well known, receiving circuit 701 is arranged so that a keypulse must be transmitted as a gate opener and a start pulse must be transmitted after the last digit as an end signal. The code used is the standard additive two-out-of-five code and the two frequency designations of each code could be added together to obtain the corresponding digits. The receiver is maintained in a disabled condition until the keypulse is received so that it will not react to unwanted signals that may appear on the line due to inductive pickup or to speech. The keypulse (KP) signal is received entirely by the signal receiver circuit without any effect on the register. Each subsequent digit causes the receiver signal present circuit and relay (SP) to operate. The (SP) relay enables the operation of receiver relay (LK) over the leads "J" and "L." Relay (LK) connects battery to the receiver channel relays (0, 1, 2, 4, 7, 10) (not shown) and when the channel thyratrons corresponding to the frequencies received operate, the corresponding receiver channel relay operates. The operation of a channel relay grounds the corresponding lead 0, 1, 2, 4, or 7 causing operation of the corresponding relays 7AO–7A7. Relays 7CK2 and 7RA also operate after receipt of a digit.

The operation of relay 7RA operates the next digit steering relay 6BS, FIG. 6, from ground through enabled make contacts 7MF–11, 7RA–10, 6AS–2 and released break contact 6BS–9. Relay 6BS locks operated via transfer contacts 6BS–9 to ground via released break contact 6ES–4 and enabled make contact 7MF–11. If by this time the digit signal is ended, the 7CK2 and 7RA relays, FIG. 7, release and allow release of the steering relay for the digit just received. If, however, the signal pulse is still present, these relays will remain operated. This interlocking feature is provided to ensure that each pulse is locked in until it has been recorded and that the register does not advance to the next digit until the end of a pulse.

2.6 Register Recording of Incoming Signals

Turning now to FIG. 7, the distant switching center, upon receipt of the second T and R lead reversal, as above discussed, transmits the two frequencies representative of the thousands digit of the directory number (0123) previously stored thereat. When the thousands digit frequencies are received in signal receiver circuit 701 via the previously established linkage connection, the relays 7A4 and 7A7, representing the digit "0" operate.

Figure 9:
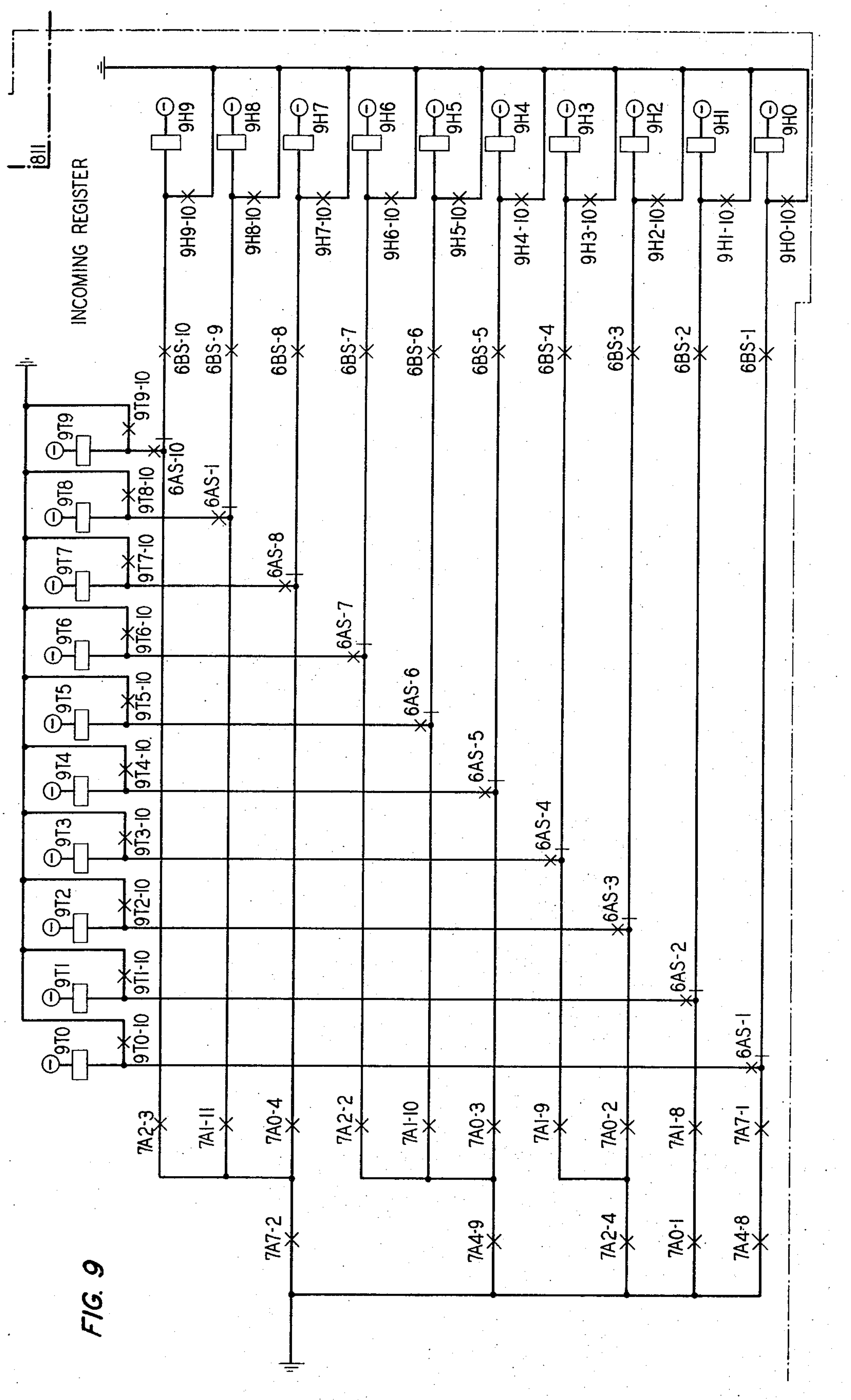

Turning now to FIG. 9, ground via enabled make contacts 7A4–8, 7A7–1 and 6AS–1 causes the enabling of relay 9TO which relay locks operated through enabled make contact 9TO–10 to ground. Relay 9TO represents the registration of a "0" as the thousands digit, since it will be recalled that the dialed directory number was 999–0123.

Returning now to FIG. 7, when the incoming frequency signals of the first digit end, relay 7RA releases thereby releasing relay 69S (FIG. 6) via released make contact 7RA–10 and enabled break contact 6BS–8. The next frequency received from the distant switching center is the frequency corresponding to the digit "1," and accordingly, relays 7AO and 7A1, FIG. 7, operate in the manner previously described.

Referring again to FIG. 9, ground via enabled make contacts 7AO–1, 7A1–8, now released break contact 6AS–2 and enabled make contact 6BS–2 operates relay 9H1 which relay locks operated to its own make contact. Relay 9H1 represents the registration of a "1" as the hundreds digit.

Returning again to FIG. 6, the reenabling of relay 7RA causes relay 6ES to operate from ground through enabled make contacts 7MF–11 and 7RA–10, released break contact 6AS–2, enabled make contact 6BS–10, and released transfer contact 6ES–5. Relay 6ES locks operated through its own transfer contact 6ES–5 to ground via enabled make contact 7MF–11.

Digressing momentarily, it should be noted at this point that since the embodiment only contains one hundred possible announcement circuits, translation of the two digits already received is sufficient to completely describe the desired announcement and the controlling register 16 could release at this point. However, in order to prevent a premature reversal to the distant sender prior to the time the sender has completed its outpulsing, relay 7RA continues to follow the incoming pulse information and thereby advances the steering control relays 6AS–6ES. When all the digits have been transmitted, the received start pulse enables relay 7TEN, FIG. 7, which relay locks operated to ground via the enabled make contacts 7TEN–10 and 7MF–10.

2.7 Translation of Registered Digits into Codes

Figure 8:
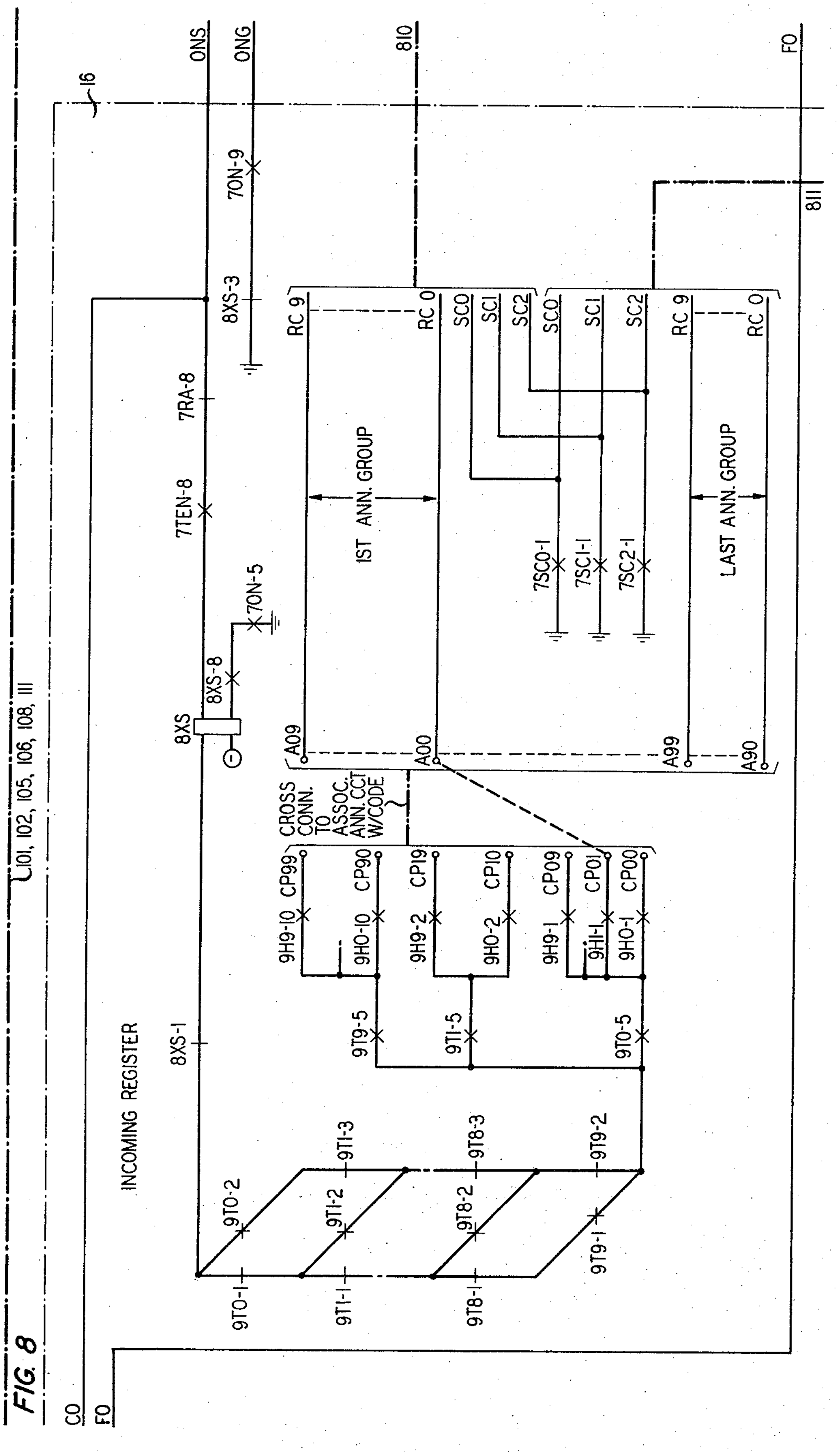
Figure 10:
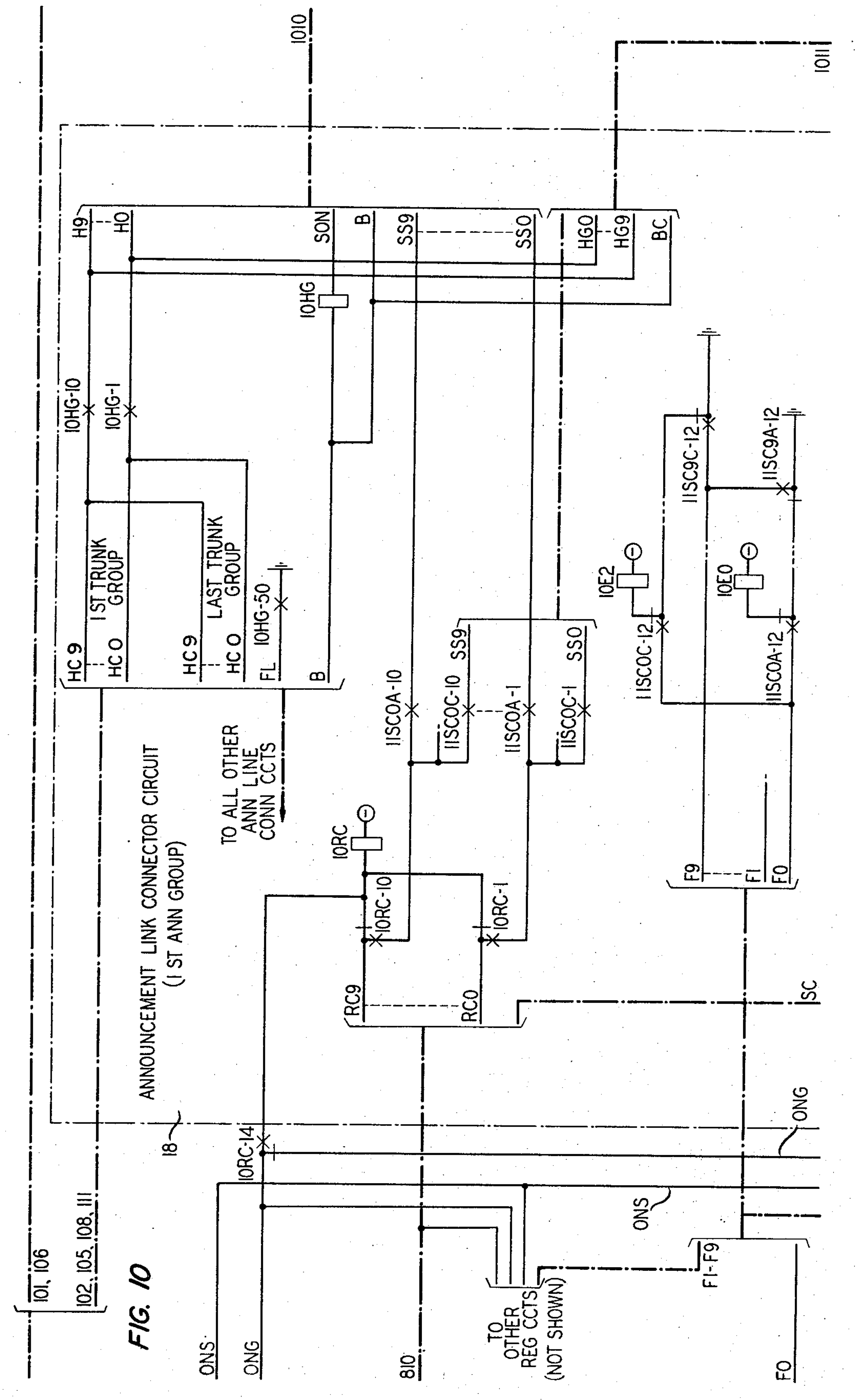
Figure 11:
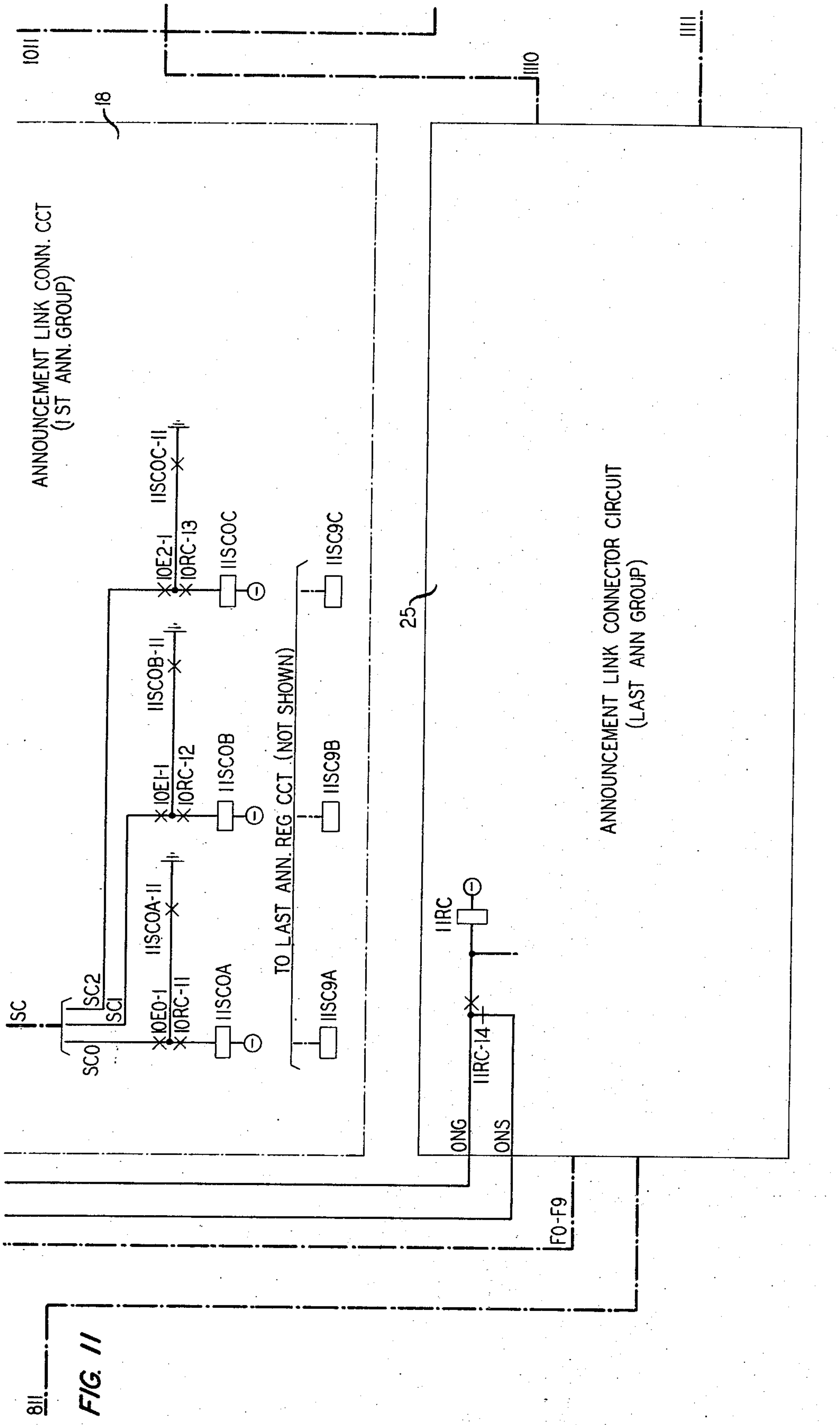

Turning now to FIG. 8, during the digit registration interval, ground was extended via released break contact 8XS–3, enabled make contact 7ON–9 and lead ONG to the announcement link connector circuits, FIGS. 10 and 11. This ground is passed through a chain of contacts associated with each announcement link connector circuit, such as released break contacts 10RC–14 and 11RC–14 and back over the ONS lead to incoming register 16, FIG. 8. The purpose of this chain of relay contacts, as will be seen from that which follows, is to ensure that only one incoming register at a particular time has access to the announcement link connector circuits.

Accordingly, ground on lead ONS, FIG. 8, is extended through released break contact 7RA–8, now enabled make contact 7TEN–8, through the winding of relay 8XS, and released break contact 8XS–1, and through a translation relay tree made up of the contacts of the 9T– relays and the 9H– relays. This relay tree is arranged so that a ground appears only on one of the CP00 to CP99 leads corresponding to the two recorded digits. Thus, since the digits "0" and "1" have been received, ground is extended to lead CP01 via enabled make contact 9TO–1 and the released break contacts 9T1–3 to 9T9–2, enabled make contacts 9TO–5 and 9H1–1. The CP00–CP99 leads are cross connected to leads A00 to A99 in groups of ten corresponding to the announcement group in which the corresponding announcement is situated. For example, since the announcement code corresponding to a ground on CP01 has been assumed to correspond to announcement circuit 20, CP01 is cross connected to the A00 lead. This follows since announcement circuit 20 is the first announcement (0) in the first announcement group (0). Accordingly, ground is extended over lead RCO and cable 810 to the announcement link connector circuit associated with the first announcement group, which is announcement link connector circuit 18, FIG. 10. Ground on lead RCO, FIG. 10, is extended via released transfer contact 10RC–1 to operate relay 10RC. Relay 10RC locks operated to ground on lead ONG via now enabled transfer contact 10RC–14. Transfer contact 10RC–14 also opens the associated chain of contacts so that no other register may access the announcement link circuits at this time.

Turning again to FIG. 8, the trunk group information, as represented by one of the operated 7SCO, 7SC1, 7SC2 relays, is communicated to the seized announcement link connector circuit 18 via ground on one of the three SCO–SC2 leads. Since relay 7SCO is operated representing activated incoming trunk 10 which is associated with the first trunk group (0), ground via enabled make contact 7SCO–1 and lead SCO, cable 810, is extended to FIG. 10 and via cable SC to FIG. 11, thereby operating relay 11SCOA via enabled make contacts 10EO–1 and 10RC–11. Relay 11SCOA operating, locks operated to ground via enabled make contact 11SCOA–11.

It should be noted that relay 10EO, FIG. 10, had been operated at this point through a chain of break contacts of each of the connector relays 11SCOA to 11SC9A. Relays 10EO–10E2 are arranged as trunk group control relays such that only one trunk group may be served at any one time and any calls waiting to be served by the trunk group can operate the respective 11SC– relays when the corresponding 10E– relay operates. The calls will be served from high to low and no other calls can operate the 11SC– relays until all locked in calls have been served. When a 10E– relay operates in response to the operation of a connector relay 11SC–, ground is extended over the F– lead corresponding to the register number of the controlling register. Accordingly, when relay 11SCOA operates, as discussed above, ground, which is in effect a marking signal, is extended over lead FO to incoming register 16, and through the register and over the previously established linkage path, FIG. 4, to the associated incoming trunk 10, via lead F. Ground on lead F operates relay 2F, FIG. 2, thereby causing resistance battery via resistor 2R1 and enabled make contact 2F–9 and ground via enabled make contact 2F–8 to be returned over leads B and HCO, respectively, over a direct path from the incoming trunk 10 and cable 102 to the associated announcement link connector circuit 18, FIG. 10. The purpose for communicating between the calling incoming trunk and the seized announcement link connector circuit with marking signals in this manner will become more apparent from that which is contained hereinafter. Also at this point, ground via enabled make contact 2F–11 and released break contact 2ALK–4 is extended over lead CO, cable 103, and the previously established linkage connection to incoming register 16, FIGS. 6 and 8.

2.8 Establishment of Direct Connection From the Calling Incoming Trunk to the Called Announcement Circuit Returning now to FIG. 8, when the connector relay, FIG. 10, operated, ground was removed from lead ONS, as discussed above. This ground is now replaced with ground from lead CO, which ground is extended through the relay tree and the cross-connection field and over lead RCO to the connector circuit, FIG. 10. Accordingly, ground is extended via now enabled make contact 10RC–1, FIG. 10, and enabled make contacts 11SCOA–1 and lead SSO, cable 1010, to the announcement link circuit serving the first announcement group and serving the first trunk group, which in this case is announcement link circuit 19, FIG. 12. Accordingly, ground on lead SSO operates relay 12SSO. Operation of relay 12SSO operates select magnet 12SELO to battery on lead B which had been extended from announcement link connector circuit 18, FIG. 10, and cable 1010. Battery is presently on lead B in the connector circuit via cable 102 from FIG. 2 in the manner previously discussed. Accordingly, although incoming register 16 is used to obtain the proper connection, control is maintained by the incoming trunk 10.

The enabling of the select magnet SSO causes a ground via enabled off-normal select magnet contact 12SELO–1 to be extended via lead SON, cable 1010, to operate relay 10HG to battery on lead B. The enabling of relay 10HG causes ground via enabled make contact 10HG–50 to be extended via lead FL and cable 102 to FIG. 2 and through enabled make contacts 2F–12, in incoming trunk 10 to provide a holding path for previously operated relay 2F.

Figure 12:
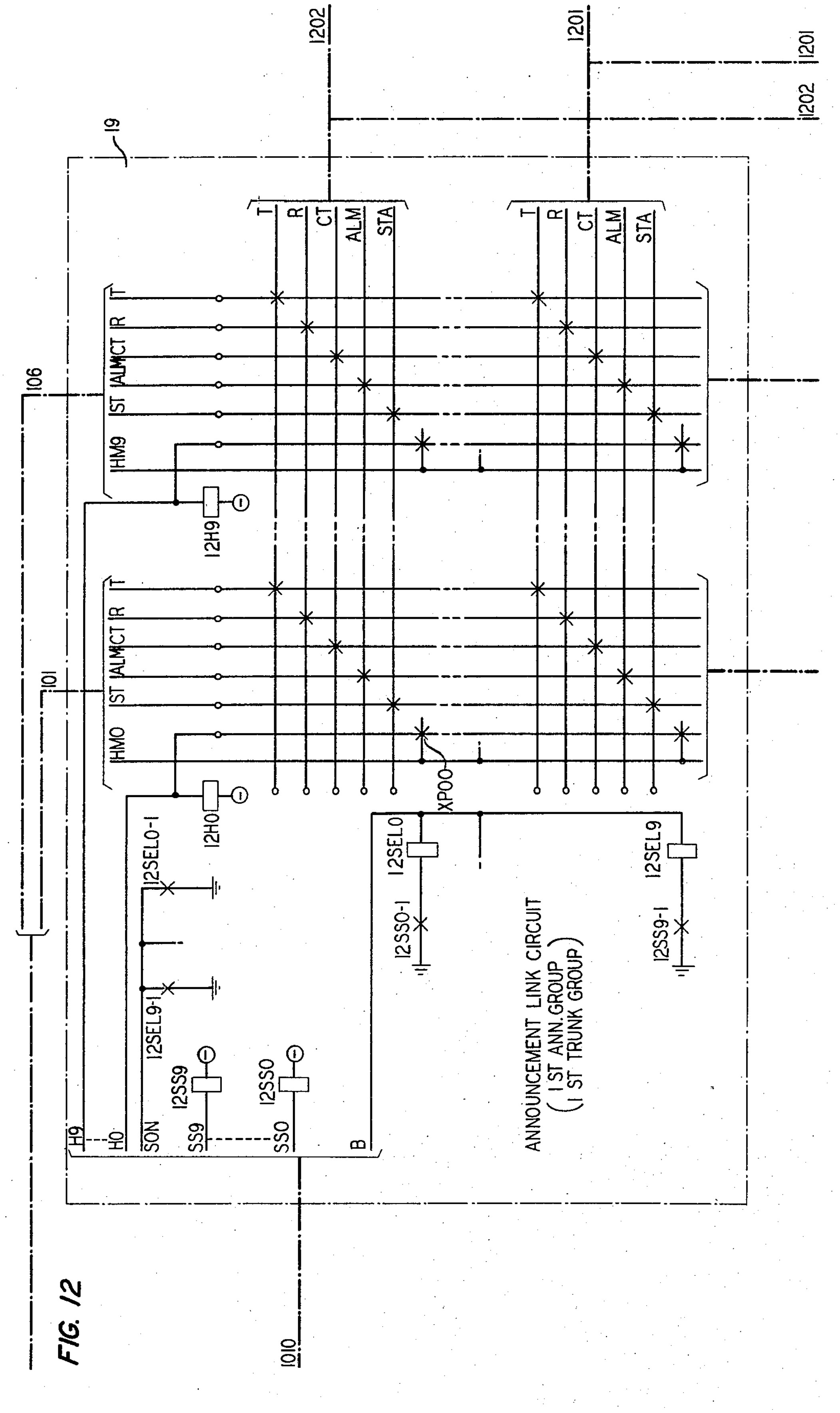
Figure 13:
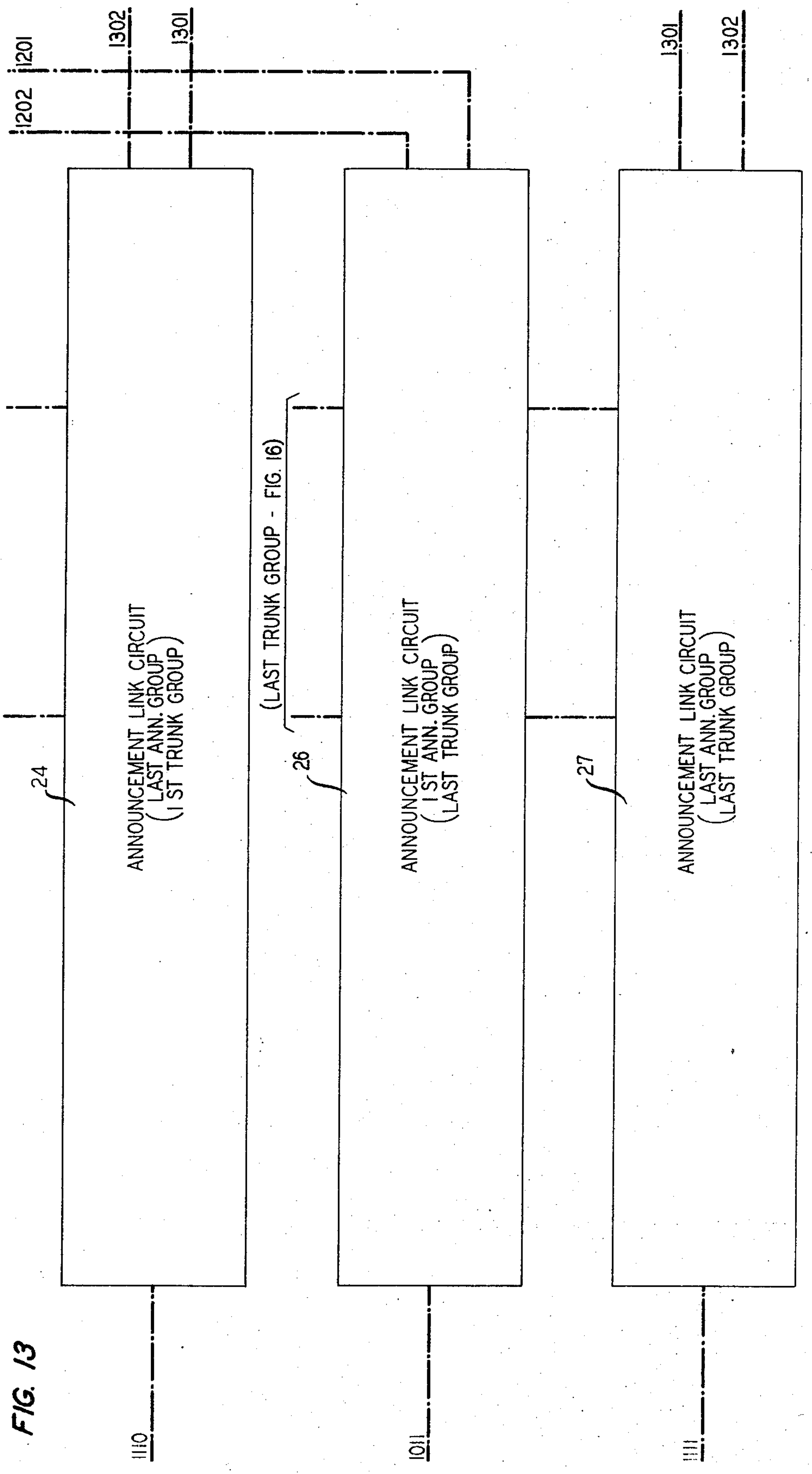
Figure 14:
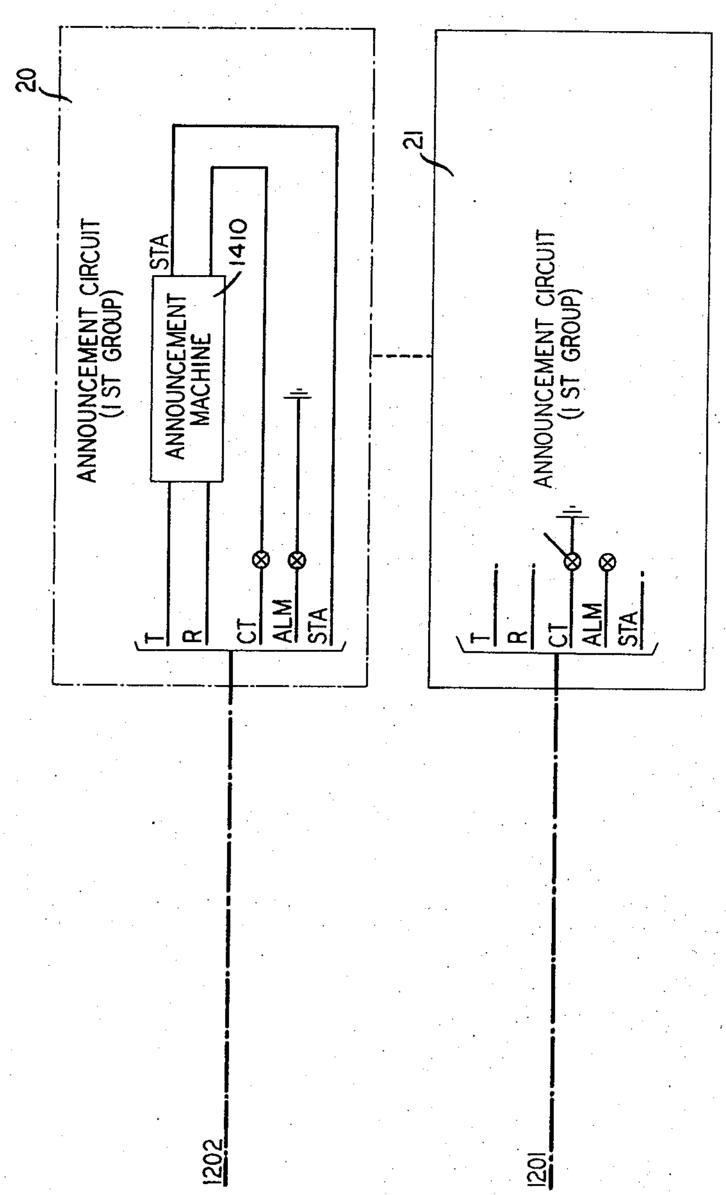
Figure 15:
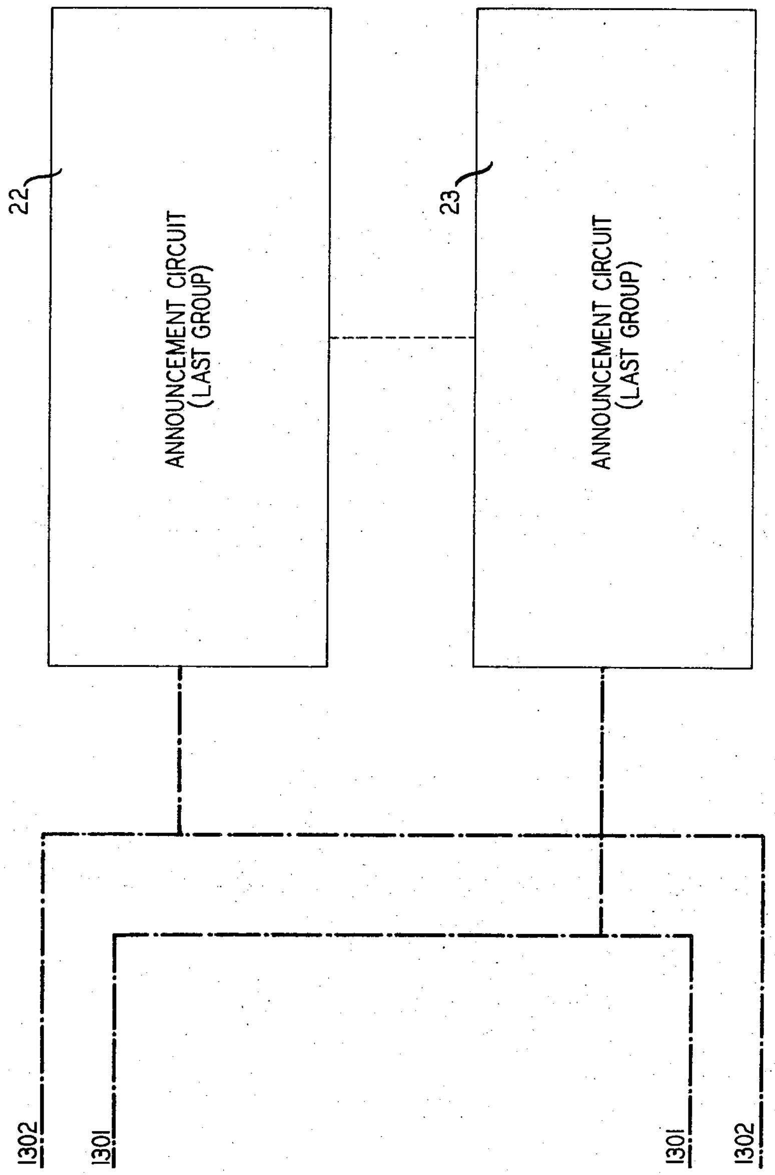
Figure 16:
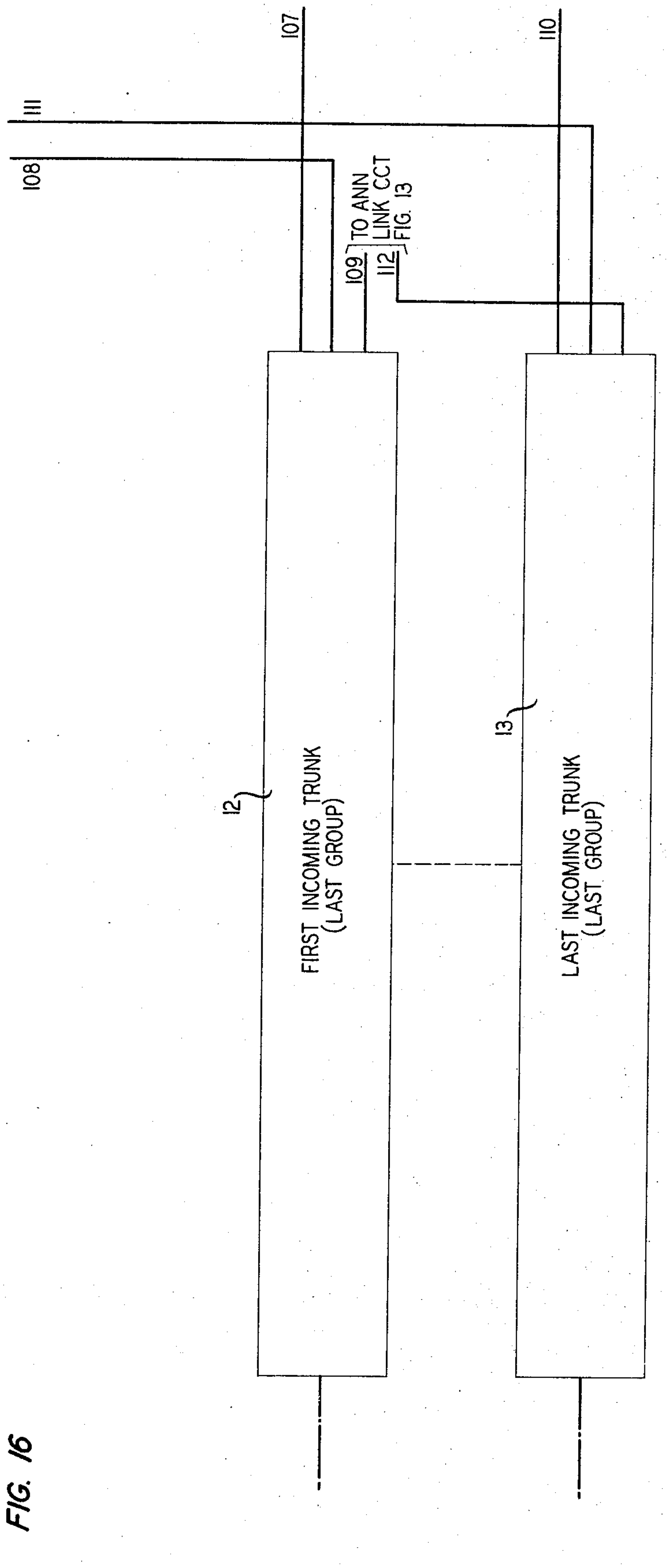

Turning to FIG. 12, the enabling of select magnet 12SELO prepared a path through a horizontal multiple of the crossbar network in the well-known manner so that the leads of cable 1202, associated with the called announcement circuit 20, FIG. 14, can be connected with any vertical multiple leads from any of the incoming trunks associated therewith. Since, as set forth above, a new calling connection is to be established from the activated incoming trunk to the called announcement circuit, which connection is entirely separate from the previously established signaling connection between the incoming trunk and the controlling register, it is important at this point to begin transferring control of the connection to the announcement circuit and to the incoming trunk. Thus, ground which had been extended from the incoming trunk, FIG. 2, on lead HCO and cable 102 to the announcement link connector circuit, FIG. 10, is, upon the enabling of relay 10HG in the manner set forth above, extended via cable 1010 and lead HO to FIG. 12 to operate hold magnet 12HO in the announcement link circuit 19.

Since the vertical leads of announcement link circuit 19 associated with hold magnet 12HO correspond to incoming trunk 10, the leads associated with the announcement circuit 20 on the previously prepared vertical multiple are now cut through the network from cable 1202 to cable 101 and extended directly to incoming trunk 10, FIG. 2. In addition, hold magnet 12HO operating ground is extended through the now enabled isolated crosspoint contact XPOO and over lead HMO and cable 101 to operate relay 2ALK in the incoming trunk, FIG. 2. As shown in FIG. 12, crosspoint contact is isolated from the horizontal multiple and instead connected onto an auxiliary vertical multiple associated with each hold magnet. Thus, upon operation of the crosspoint, control of the connection is given to the associated trunk circuit in the manner to be detailed hereinafter.

Turning now to FIG. 2, operation of relay 2ALK causes the removal of ground from lead CO via enabled break contact 2ALK–4. Accordingly, since the CO lead ground had been the operate ground for the announcement link switching network, via the previously established linkage path through the controlling register, the 12SELO select magnet, FIG. 12, releases at this point, thereby releasing relay 10HG, FIG. 10. Accordingly, ground is removed from lead FL, cable 102, the removal of which causes relay 2F in incoming trunk 10, FIG. 2, to release.

In addition, ground via enabled make contacts 2ALK–1 and 3B–12 provide an alternate hold path for relay 2ALK. This ground is also extended over lead HMO and cable 101 to the announcement link, FIG. 12, to maintain hold magnet 12HO operated through its isolated crosspoint contact XPOO. Accordingly, at this point a connection through the announcement link circuit 19, FIG. 12, is held entirely by ground from the connected incoming trunk 10 and the connection is no longer dependent on the controlling incoming register 16 or on the announcement link connecting circuit.

2.9 Release of Controlling Incoming Register

Turning again to FIG. 2, ground via enabled make contact 2ALK–1 and released break contact 2F–10 is extended over lead D, cable 103 to incoming register link circuit 15, FIG. 4, and through the enabled switching network and lead DO, cable 410, to the incoming register 16, FIG. 6, thereby enabling relay 6RL.

Turning now to FIG. 6, relay 6RL locks operated from ground via enabled make contacts 70N–5 and 6RL–3. Accordingly, ground is removed via now enabled break contact 6RL–2 from lead HMO thereby releasing the hold magnet of the signaling connection through the switching network, FIG. 4. In addition, ground is removed from relay 70N via enabled transfer contact 6RL–5, FIG. 7. However, relay 7RB remains operated via enabled make contact 6RL–5. Relay 6RL, FIG. 6, releases upon the release of relay 70N via now released make contact 70N–5 and the released crosspoint connection.

Turning now to FIG. 7, relay 6RL releasing releases relay 7RB thereby removing resistance battery from leads RPO through RP9 which batteries had been extended via cable 510 to incoming register link circuit 15, FIG. 5, as an indication that incoming register 16 was busy. Accordingly, at this point the busy-idle relays in the associated incoming register link circuits now return to normal and incoming register 16 is free to handle calls from all other incoming trunks in its regular preference order as determined by each group of incoming trunks in the manner previously set forth.

2.10 Return of Signals to Calling Subscriber

Returning again to FIG. 2, upon the release of incoming register 16, relay 2RLK releases in a straightforward manner so as to reconnect the T and R leads of the calling subscriber to the winding of relay 2A via now released break contacts 2RLK–10 and 2RLK–11. Relay 2A thereupon again assumes control of the incoming connection and maintains relay 3B, FIG. 3, operated at this point.

The release of relay 2RLK allows start signals which in the instant embodiment could be ringing potential or other special signals to be returned from signal source 210 via capacitor 2C3, enabled make contact 3B–10, released break contacts 3BA–3 and 3CT–1, enabled make contact 2SC–1 and released break contacts 2RLK–11 and 3BA–7 to the R lead of the interoffice trunk 10. Relay 2SC, which relay, as discussed above, controls the application of ringing tone, is arranged as a slow release relay, the release time being adjustable to provide a preset number of cycles of ringing potential or a preset number of pulses or other signals. The beginning of the release period for relay 2SC occurs when the 2ALK relay operates and battery is removed from the 2SC relay via now enabled transfer contact 2ALK–3. The release of relay 2SC also provides start and control signals for the connected announcement circuit in the manner to be discussed hereinafter.

2.11 Call to a Valid Announcement-Calling Subscriber Charged

There are two conditions which could exist when a calling subscriber dials the 999 code followed by four digits; either the dialed number corresponds to a valid, currently active announcement, or the dialed number corresponds to an announcement currently not in use. In the situation of a valid call, the calling subscriber is charged or a message unit added for the call and the called announcement is returned. In the situation where a call is directed to a nonworking announcement code, a special announcement is returned informing the calling subscriber that the number he dialed is not working. In this case, a charge is not made for the call, even though an announcement is returned. A connection to a valid announcement circuit will now be detailed.

Turning now to FIG. 14, since announcement circuit 20 is arranged as a valid announcement, ground is connected to lead ALM. This ground is extended via lead ALM, cable 1202 and the newly established linkage connection, FIG. 12, and cable 101 to FIG. 3, lead ALM. When the 2SC relay releases, tone is removed from the R lead via released make contact 2SC–1, FIG. 2, and ground via released break contact 2SC–5, FIG. 3, and released break contacts 3BA–8 and 3TO–4 and enabled make contact 3B–9 to operate relay 3BA.

Continuing now in FIG. 2, relay 3BA operating, removes the resistance short from the T and R leads to the announcement circuit via enabled break contact 3BA–4. The T and R leads of the incoming trunk are reversed at this point via enabled transfer contacts 3BA–9 and 3BA–7, thereby causing the calling office to record a charge condition for this call.

Turning again to FIG. 3, when the 2SC relay releases, ground is also extended via released break contact 2RLK–8, enabled make contact 2ALK–5, and released break contact 2SC–7 over lead STP, cable 101 and through the newly established linkage connection, FIG. 12, and cable 1202 to announcement circuit 20, FIG. 14, to announcement machine 1410. Announcement machine 1410 is arranged in any one of a well-known circuit configuration operable upon a ground being connected to one lead to provide a continuously repetitive announcement over leads T and R and further operable at the end of the announcement interval to provide a ground on another lead.

Continuing in FIG. 14, a ground on lead STA causes announcement machine 1410 to begin the transmission if an announcement over leads T and R, which announcement corresponds to the particular message associated with the called number, 999–0123, and which announcement is transmitted in the form representative of audible communications. Accordingly, the selected announcement is returned via leads T and R and over the previously described linkage connection directly to incoming trunk 10, FIG. 2, leads T and R, and via pad 202, capacitors 2C1 and 2C2, enabled make contacts 3BA–11 and 3BA–1, released break contacts 2RLK–10 and 2RLK–11, enabled transfer contacts 3BA–9 and 3BA–7 and over the R and T leads to the subscriber at the distant switching center.

Returning now to FIG. 14, at the end of the announcement transmission, announcement machine 1410 extends to ground via lead CT through the linkage connection to FIG. 3 and via released break contact 2SC–6, enabled make contact 3B–7, forward-biased diode 3CR, enabled make contact 2A–12, released break contacts 2RLK–9 and 3CT–6 and enabled make contact 3B–1 to operate relay 3CT to resistance battery via resistor 3RL. Relay 3CT operating, locks operated to ground via enabled transfer contact 3CT–6. The operation of relay 3CT provides ground via enabled make contacts 3CT–3 and 3B–2 to one side of relay 3TO. However, relay 3TO remains normal at this point since ground is also present on the other side of the relay from lead CT.

Since it is possible that the announcement machine 1410 had not been at the beginning of the announcement when it had been connected to the calling subscriber, provision is made to ensure that at least one full announcement is returned over the interoffice trunk. Accordingly, since relay 3TO is normal at this point, announcement machine 1410, FIG. 14, is permitted to recycle, thereby removing ground from lead CT. Removal of ground from lead CT allows relay 3TO to operate and to lock operated via enabled make contact 3TO–2. Since relays 3CT and 3TO are both operated at this point, relay 3BA remains operated to ground via enabled make contacts 3CT–12, 3TO–4, and 3B–9.

At the end of the second announcement, ground is again returned over lead CT, and released break contact 2SC–6, enabled make contact 3B–7, forward-biased diode 3CR, enabled make contact 2A–12, released break contact 2RLK–9, now enabled make contacts 3TO–3 and 3CT–8 to shunt down relay 3CT. Since relay 3TO is operated at this point while relay 3CT is normal, relay 3BA releases via released make contact 3CT–12 and enabled transfer contact 3TO–4. The release of relay 3BA, again reverses the T and R leads, FIG. 2, via released transfer contacts 3BA–9 and 3BA–7, thereby starting a time-out condition in the originating switching center if the calling customer fails to hang up.

Continuing in FIG. 2, the connection from the T and R leads of the incoming trunk to the called announcement circuit is open at this point via now released make contacts 3CT–10, 3BA–11, 3BA–1 and 3CT–9. When the calling subscriber goes on-hook, relay 2A releases, thereby releasing relay 3B which in turn releases relay 2ALK. Relay 3B releasing, also removes ground from lead HMO which ground, it will be recalled, was the switching network holding ground for announcement link circuit, FIG. 12. Accordingly, the connection through the switching network from announcement circuit 20 to incoming trunk 10 is disconnected at this point. A shunt path is provided via enabled make contacts 2ALK–3, to ensure that relay 2A does not reoperate until all relays are normal. Accordingly, all relays in incoming trunk 10 return to their normal status in preparation for the handling of another incoming call from the associated distant switching center.

2.12 Call to a Nonworking Announcement Code

As discussed above, when a calling subscriber dials a code which is vacant, that is, one not assigned a working announcement, the announcement switching center is arranged to return a special announcement informing the calling party of the error. In this situation, although an announcement is returned, the calling subscriber is not charged for the call.

Turning now to FIG. 8, the cross-connection field of each incoming register is arranged to connect all nonassigned code points to one of the special announcement circuits, such as announcement circuit 21. Since announcement circuit 21 is the second announcement in the first group of announcements, all unassigned code points are connected to lead AO1 (not shown). Accordingly, when the controlling register translates the dialed digits of an incoming call into a ground on code point CP01, a linkage is established, in the manner set forth above, from the calling incoming trunk to announcement circuit 21, FIG. 14.

Continuing now in FIG. 14, since announcement circuit 21 is a special announcement circuit arranged to return a vacant code announcement, lead ALM is not grounded, as was lead ALM in announcement circuit 20, but instead, lead CT is grounded. Thus, so far as the incoming trunk is concerned, announcement circuit 21 always looks as though it had completed one announcement.

Turning now to FIG. 3, when announcement circuit 21 is connected to the incoming trunk, lead CT is immediately grounded, thereby operating relay 3CT. Since the ALM lead is not grounded, relay 3BA remains normal and a reversal is not sent back to the calling office and the calling subscriber is not charged for the call. Operation of relay 3CT opens the T and R short, FIG. 2, to the announcement circuit via enabled break contact 3CT-11, and the announcement message is returned to the calling subscriber. At the completion of the special message, the calling subscriber goes on-hook and the 2A relay releases, thereby releasing the incoming trunk in the manner set forth above.

2.13 Typical Announcement Office

Figure 18:
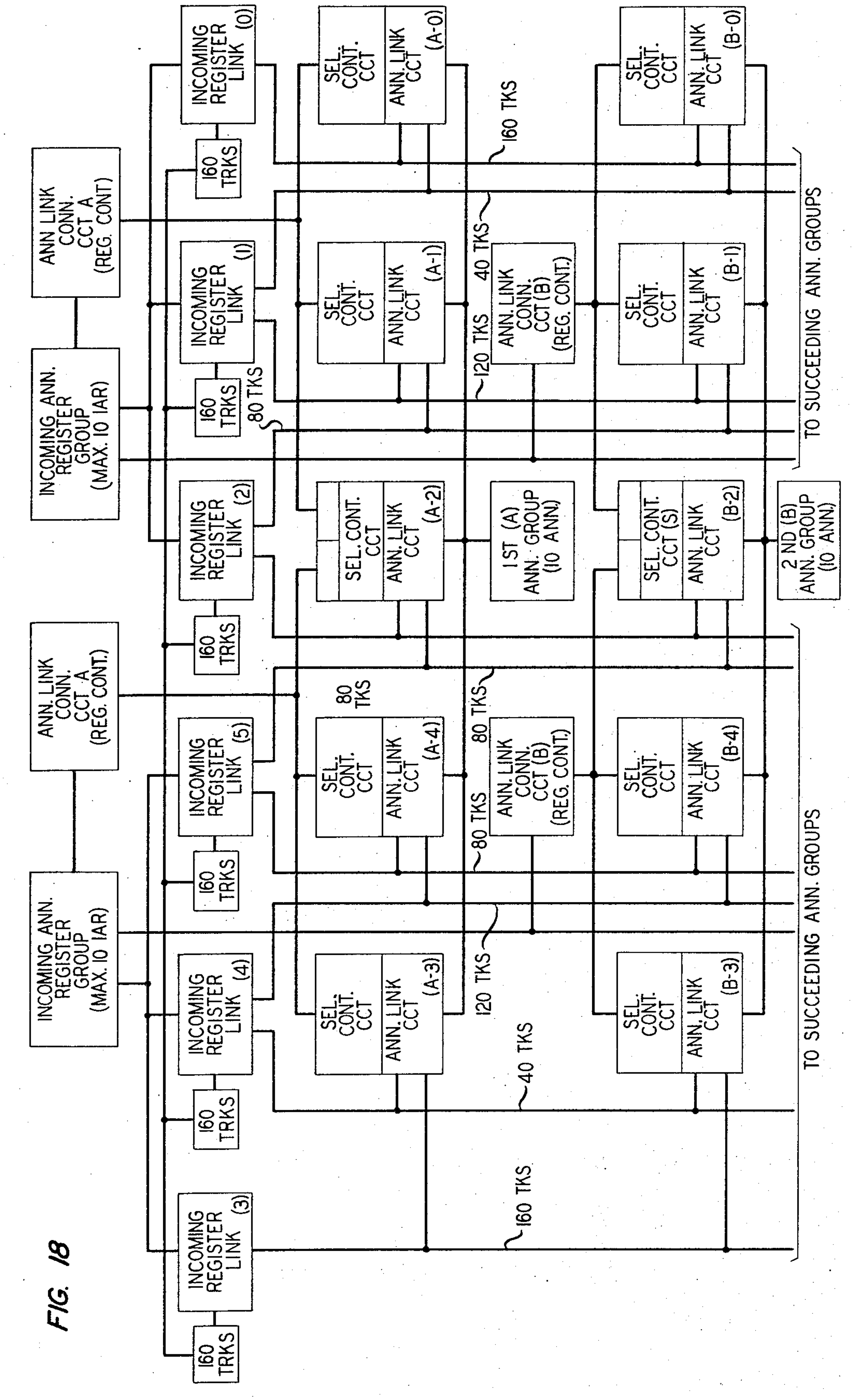
FIG. 18 shows an equipment layout of a typical announcement office where the various equipments are divided into groups.
Figure 19:
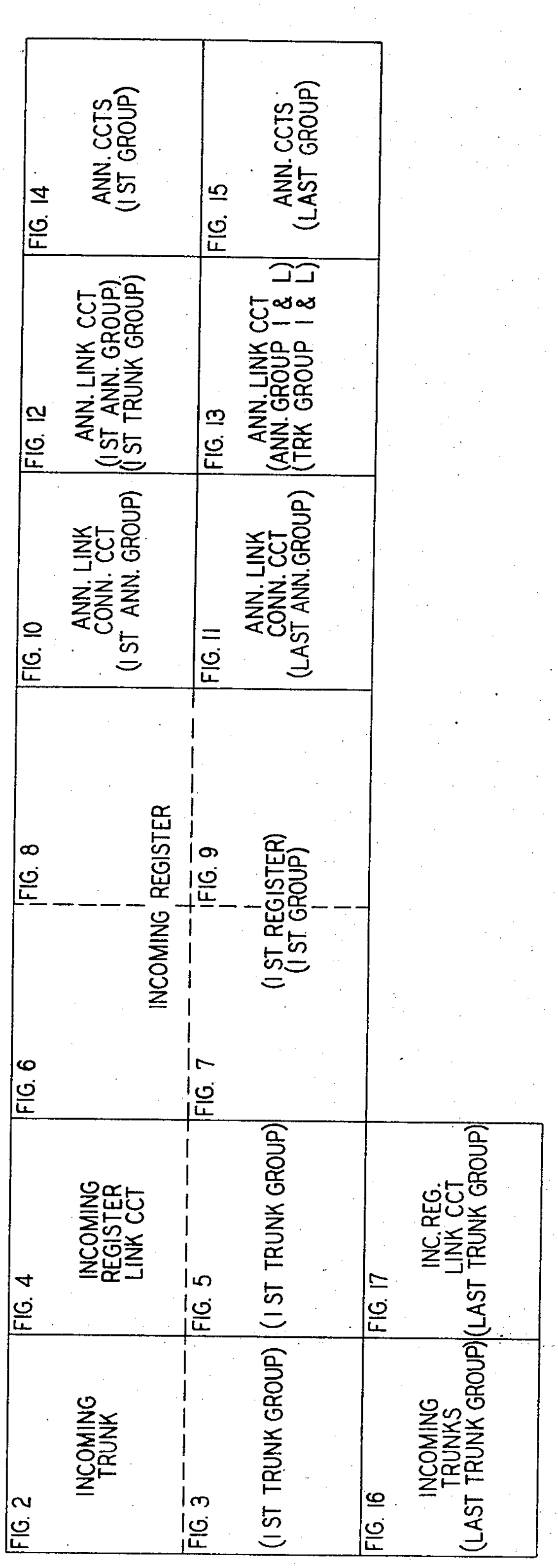
FIG. 19 shows the manner in which FIGS. 2 through 19 should be arranged.

FIG. 18 illustrates how an announcement central office may be arranged with groups of registers serving groups of trunks. The interrelationship and relative quantities of the various elements are shown for a typical announcement switching center. Provision is made to add additional announcement circuits as needed. The particular arrangement shown can be reduced or expanded as service volume and holding time per announcement circuit dictate.

Since in the illustrative embodiment, each connection is completed on a "barge-in"basis, no provision has been made for duplicate announcement circuits. However, for systems in which an announcement is returned only to one calling station at a time, such as a computer data retrieval system, duplicate announcements could be provided and the system arrangement and operation changed accordingly.

2.14 Conclusion

While the equipment of this invention has been shown in a particular embodiment wherein incoming calls to a called station are completed to an audible announcement machine under control of an incoming register at the terminating switching center, it is to be understood that such an embodiment is intended only to be illustrative of the present invention and that numerous other arrangements may be devised by those skilled in the art without departing from the spirit and scope of the invention.

For example, the invention may be used to complete connections to any termination type of circuit such as computers, data switching equipment and other machine terminals.

Another example would be where the invention is used to establish a communication connection to mobile stations which stations are arranged for two-way communication but which are not arranged for call initiation. Such an arrangement could be a dispatch system for police or fire use.

Another example could be where the calling switching center acts as a tandem office for routing calls in one direction only. Provision could be made to arrange the register to hunt for an idle route (terminating circuit) among the routes associated with the received translated directory number.

What is claimed is:

1. In a telephone switching system having a plurality of central office switching centers in which connections are established between a calling subscriber at a calling switching center and a called subscriber at a called switching center in response to directory number representative signals transmitted over a trunk circuit between the calling and called switching centers, the combination comprising a plurality of terminating circuits at a called one of said switching centers, each terminating circuit assigned a unique code, a register at said called one of said switching centers, means for establishing a first connection from a calling one of said switching centers over a first one of said trunk circuits to said register, means in said connected register for receiving directory number representative signals over said connected first trunk from said calling switching center and for translating said received signals into one of said codes representative of a called one of said terminating circuits, means controlled by said connected register for establishing a second connection between said first trunk associated with said calling switching center and said terminating circuit associated with said translated code, and means controlled by said second connection establishing means and responsive to said establishment of said second connection for releasing said first connection between said first trunk and said connected register and for transferring control of said second connection establishing means from said connected register to said connected first trunk circuit.

2. The invention set forth in claim 1 wherein said second connection establishing means includes a matrix network for connecting any of said trunks to any of said terminating circuits, and a matrix control circuit responsive to said register translation means for controlling connections through said matrix network.

3. The invention set forth in claim 1 wherein said control transfer means includes a signal path from said second connection establishing means via said first connection and through said connected register to said first trunk circuit.

4. The invention set forth in claim 1 wherein each said terminating circuit is operable to provide a unique message, means responsive to the establishment of said second connection to a called one of said terminating circuits for transmitting a call charging signal to said calling switching center, and means concurrently operative with the transmitting of said charging signal for enabling the transmission of said called terminating circuit message over said first trunk circuit to said calling switching center.

5. The invention set forth in claim 4 wherein said second connection is established to a special terminating circuit when said translated code corresponds to an unassigned terminating circuit.

6. The invention set forth in claim 5 further comprising means responsive to the establishment of said second connection to said special terminating circuit for inhibiting said transmission of said call charging signal while still enabling the transmission of said message associated with said special terminating circuit over said first trunk circuit to said calling switching center.

7. In a unidirectional central office switching center in which only incoming connections from distant central office switching centers may be established, the combination comprising a plurality of trunk circuits interconnecting said unidirectional central office with said distant central offices;

a plurality of registers;

a plurality of terminating stations;

a first switching stage operable for establishing connections from calling ones of said central offices via activated ones of said trunk circuits to any of said registers;

a second switching stage operable for establishing direct connections from activated ones of said trunk circuits to any of said terminating stations;

control means in said first switching stage for determining the idle and priority status of any of said registers and for enabling a connection through said first switching stage from an activated one of said trunk circuits to the highest priority idle register;

means in said first switching stage control means responsive to the establishment of said connection for transferring control of said connection exclusively to said connected register;

said connected register comprising means concurrently operable with the enabling of said transfer means for enabling the transmission of called station designations from said connected calling switching office over said activated trunk circuit, means for receiving said designations, means for translating a received designation into a code representative of a called terminating station, and means controlled by said translating means for seizing said second switching stage;

control means in said second switching stage responsive to a seizure from said connected register for preparing a calling connection through said second switching stage to said called terminating station corresponding to said translated code, and means including said activated trunk circuit for completing said calling connection through said second switching stage from said called terminating station to said activated trunk circuit.

8. The invention set forth in claim 7 further comprising means in said second switching stage control means responsive to said establishment of said calling connection for transferring control of said calling connection exclusively to said activated incoming trunk, and means operable in response to the enabling of said transfer control means for releasing said connection through said first switching stage so as to disassociate said connected register from said calling connection.

9. The invention set forth in claim 7 wherein said calling connection preparation means includes means for applying a signal through said connected register and over said first stage connection to said activated incoming trunk, and means for returning a signal from said activated incoming trunk over said first stage connection and through said translating means of said connected register to said second switching stage control means.

10. The invention set forth in claim 9 wherein said second switching stage connection completing means further includes means for applying signals from said activated trunk circuit directly to said second switching stage control means.

11. The invention set forth in claim 10 wherein said second switching stage comprises a crossbar switch having select magnets controlling horizontal multiples each associated with individual ones of said terminating stations and hold magnets controlling vertical multiples each associated with individual ones of said incoming trunk circuits, and wherein said transfer control means includes a direct connection between said incoming trunk circuit and an isolated crossbar switch contact on the vertical multiple controlled by said hold magnet associated with said incoming trunk circuit.

12. A central office telephone switching system comprising a plurality of trunks, a plurality of registers, a plurality of terminal circuits each identified by a unique code, a register link responsive to the activation of one of said trunks for establishing a first connection from said activated trunk to an idle one of said registers and for transferring to said connected register certain trunk identification information, means in said connected register responsive to signals transmitted over said connected trunk for translating said signals into codes representative of a called terminal circuit, a terminal circuit link controlled directly by said connected register and responsive jointly to trunk identification information from said connected register and to a translated code from said connected register for preparing a second connection from said activated trunk to said called terminal circuit, means for transmitting a signal over said first connection from said terminal circuit link to said activated trunk to mark a position in said terminal circuit link associated with said activated trunk and means responsive to said marking signal for establishing an exclusive connection between said activated trunk and said called terminal circuit.

13. The invention set forth in claim 12 wherein said last-mentioned means includes means in said activated trunk for detecting said last established connection and for releasing said first connection from said activated trunk to said connected register.

14. The invention set forth in claim 12 wherein said register translation means is further arranged for translating signals representative of nonassigned terminal circuits into predesignated codes representative of special terminal circuits.

15. The invention set forth in claim 14 further comprising means for returning a start signal over said activated trunk for a fixed interval prior to enabling transmission over said activated trunk from said connected terminal circuit associated with said translated code.

16. The invention set forth in claim 15 further comprising means concurrently responsive to the end of said start signal interval and to connection to a terminal circuit identified by an assigned code for returning call charging signals over said activated trunk and for enabling transmission from said activated trunk to said connected terminal circuit.

17. The invention set forth in claim 16 further comprising means concurrently responsive to the end of said start signal interval and to connection to a terminal circuit identified by a predesignated code for inhibiting said transmission of said call charging signals while still enabling from said connected terminal circuit to said activated trunk.

18. The invention set forth in claim 16 wherein said terminal circuits are each arranged with a repetitive announcement machine, said transmission enabling means includes means for ensuring that at least one full announcement cycle is returned over the activated trunk, and means for preventing more than two announcement cycles from being returned over said activated trunk.

19. In a central office switching system in which connections are completed to called stations in accordance with unique directory numbers transmitted from other central offices over interoffice trunks, the combination comprising a first register link having vertical and horizontal multiples wherein individual interoffice trunks in a first group of said interoffice trunks are each associated with one of said vertical multiples, a second register link having vertical and horizontal multiples wherein individual interoffice trunks in a second group of said interoffice trunks are each associated with one of said vertical multiples, a plurality of incoming registers each associated with one of said horizontal multiples in each of said first and second register links, connection control means responsive to a calling one of said interoffice trunks for establishing a connection from said calling interoffice trunk through said register link associated with said calling interoffice trunk to an idle first one of said registers, means in a said connected first incoming register for receiving signals representative of a called directory number over said connected calling interoffice trunk and for translating received ones of said signals into a control signal representative of a called one of said stations, a first announcement link having vertical and horizontal multiples wherein individual interoffice trunks in said first group of said interoffice trunks are each associated with one of said vertical multiples and wherein individual ones of said stations in a first group of said stations are each associated with one of said horizontal multiples, a second announcement link having vertical and horizontal multiples wherein individual interoffice trunks in said first group of said interoffice trunks are each associated with one of said vertical multiples and wherein individual ones of said stations in a second group of said stations are each associated with one of said horizontal multiples, a third announcement link having vertical and horizontal multiples wherein individual interoffice trunks in said second group of said interoffice trunks are each associated with one of said vertical multiples and wherein individual ones of said stations in said first group of said stations are each associated with one of said horizontal multiples, a fourth announcement link having vertical and horizontal multiples wherein individual interoffice trunks in said second group of said interoffice trunks are each associated with one of said vertical multiples and wherein individual ones of said stations in said second group of said stations are each associated with one of said horizontal multiples, means controlled by said connected incoming register translation means for enabling the announcement link corresponding jointly to the group with which said called station is associated and the group with which said connected calling incoming trunk is associated, and means controlled jointly by said enabled one of said announcement links and by said register translation means for establishing a connection from said calling incoming trunk to said called station through said enabled link.

20. The invention set forth in claim 19 wherein said last-mentioned means includes a signal path from said calling incoming trunk through said connected incoming register for communicating said called station information and a signal path direct from said calling interoffice trunk for communicating said trunk identification.

21. The invention set forth in claim 20 further comprising means operative in response to the establishment of said connection through said announcement link for releasing said connection between said calling interoffice trunk and said connected incoming register so that said register is available to handle other terminating connections.

22. The invention set forth in claim 21 wherein said connection control means is arranged to allow only one calling connection to be established in any one incoming register link at a time while allowing simultaneous calling connections to be established in different incoming register links, and means interposed between said incoming registers and said announcement links for insuring that connections through said announcement links are enabled by only one register at a time.

23. The invention set forth in claim 22 wherein each said called station includes an announcement machine for returning a message over a connected incoming trunk, and means controlled by said incoming register translation means for translating signals corresponding to unassigned codes into a code corresponding to a predetermined one of said announcement machines so that a predetermined message will be returned over a connected incoming trunk when a directory number is received which is not translatable into a working code.

24. An announcement switching center for providing selected announcements to trunks interconnecting the announcement switching center with a plurality of other switching centers comprising a plurality of registers for receiving control signals from said trunks, a register link for connecting said registers to said trunks over a first connection from said trunks, a plurality of announcement circuits, an announcement link, and means controlled by said announcement link and responsive to control information in one of said registers from one of said trunks for transmitting a signal from said announcement link through a first established connection from said one register to said one trunk and back to said announcement link for establishing a second connection from said one trunk to a selected announcement circuit.

25. An announcement switching center in accordance with claim 24 wherein said announcement link comprises a single stage crossbar switch including hold magnets and said second connection establishing means comprises means for applying a ground connection through said first connection, said one register, and said one trunk to operate one of said select magnets.

26. An announcement switching center in accordance with claim 25 further comprising means responsive to said second connection through said switch for releasing said first connection.

* * * * *

UNITED STATES PATENT OFFICE
CERTIFICATE OF CORRECTION

Patent No. 3,697,702 Dated October 10, 1972

Inventor(s) John J. Buonsante, Lambert Freericks, Harold J. Haarmann and John C. Sieglinger It is certified that error appears in the above-identified patent and that said Letters Patent are hereby corrected as shown below:

Column 4, line 21, change "(994+four digits)" to --(999+4 digits)--.

Column 6, line 15, before "pulses" insert --key--.

Column 7, line 2, before "(not shown)" insert --relay--.

Column 12, line 46, change "69S" to --6AS--.

Column 23, line 27, after "enabling" and before "from" insert --transmission--.

Signed and sealed this 3rd day of April 1973.

(SEAL)
Attest:

EDWARD M.FLETCHER,JR.
Attesting Officer

ROBERT GOTTSCHALK
Commissioner of Patents